United States Patent [19]
Morizono et al.

[11] Patent Number: 6,143,827
[45] Date of Patent: Nov. 7, 2000

[54] OLEFIN THERMOPLASTIC ELASTOMER COMPOSITION

[75] Inventors: Kenichi Morizono; Keiji Okada; Masayoshi Yamaguchi, all of Waki-cho, Japan

[73] Assignee: Mitsui Chemicals Inc, Tokyo, Japan

[21] Appl. No.: 09/118,819

[22] Filed: Jul. 20, 1998

[30] Foreign Application Priority Data

Jul. 18, 1997 [JP] Japan .................................... 9-209976
Dec. 9, 1997 [JP] Japan .................................... 9-338394

[51] Int. Cl.⁷ ........................................................ C08F 8/00
[52] U.S. Cl. ............................. 525/192; 525/194; 525/387
[58] Field of Search .................................. 525/192, 194, 525/387

[56] References Cited

U.S. PATENT DOCUMENTS

| | | | |
|---|---|---|---|
| 4,130,535 | 12/1978 | Coran et al. | ............................. 525/192 |
| 4,645,793 | 2/1987 | Von Hellens et al. | |
| 5,191,052 | 3/1993 | Welborn, Jr. | |

FOREIGN PATENT DOCUMENTS

| | | |
|---|---|---|
| 320762 | 6/1989 | European Pat. Off. |
| 55-18448 | 2/1977 | Japan |
| 278687 | 3/1990 | Japan |
| 4268307 | 9/1992 | Japan |
| 9607681 | 3/1996 | WIPO |
| WO96/07681 | 3/1996 | WIPO |

OTHER PUBLICATIONS

Makromol. Chem. 192, 2591–2601 (1991)—C NMR analysis of α–olefins copolymers with 1,3–butadiene obtained with zirconocenes/methylalumoxane . . .

Makromol. Chem. Phys., 197, 1071–1083 (1996)—Influence of polymerizatrion conditions on the copolymerization of styrene . . . Ziegler–Natta catalysts.

Macromolecules 28, 4665–4667 (1995)—Regiospecificity of Ethylene–Styrene Copolymerization with a Homogeneous Zirconocene Catalyst.

Journal of Organaometallic Chem., 228 (1985) pp. 63–67—Synthesis and Crystal Structure of a Chiral ansa–Zirconocene Derivative with . . . Ligands.

*Primary Examiner*—Bernard Lipman

[57] ABSTRACT

Disclosed is an olefin thermoplastic elastomer composition obtained by dynamically heat treating, in the presence of an organic peroxide, a blend comprising 10 to 60 parts by weight of a crystalline polyolefin resin (A) and 40 to 90 parts by weight of an unsaturated olefin copolymer (B) of at least one α-olefin of 2 to 20 carbon atoms, a conjugated diene monomer represented by the following formula (I), and optionally, an aromatic vinyl compound, the total amount of said components (A) and (B) being 100 parts by weight;

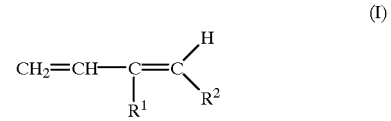

(I)

wherein $R^1$ and $R^2$ are each independently a hydrogen atom, an alkyl group of 1 to 8 carbon atoms or an aryl group, and at least one of $R^1$ and $R^2$ is a hydrogen atom. The composition has excellent moldability and can provide a molded product having excellent elastomeric properties, tensile strength properties and appearance.

52 Claims, No Drawings

OLEFIN THERMOPLASTIC ELASTOMER COMPOSITION

FIELD OF THE INVENTION

The present invention relates to olefin thermoplastic elastomer compositions, and more particularly to olefin thermoplastic elastomer compositions having excellent moldability and capable of providing molded products having excellent elastomeric properties and tensile strength properties.

BACKGROUND OF THE INVENTION

Because of lightweight properties and ease of recycling, olefin thermoplastic elastomers are widely used for automobile parts, industrially mechanical parts, electrical or electronic parts and building materials, as elastomers of energy-conservation or resource-conservation type, particularly as substitutes for vulcanized rubbers. However, the conventional olefin thermoplastic elastomers generally have a defect of inferior elastomeric properties to the vulcanized rubbers, and improvement of the defect has been eagerly desired.

As improved olefin elastomers which are substitutes for the vulcanized rubbers, completely crosslinked olefin thermoplastic elastomers having high degree of crosslinking (e.g., thermoplastic elastomer described in Japanese Patent Publication No. 18448/1980) have been hitherto proposed. Though the completely crosslinked olefin thermoplastic elastomers are superior to partially crosslinked olefin thermoplastic elastomers in the elastomeric properties, they have problems of moldability and appearance of their molded products, and therefore the use application of the elastomers is specifically limited.

In International Publication WO96/07681, a crosslinked thermoplastic comprising an ethylene/styrene/ethylidene norbornene copolymer and polypropylene is described. However, this crosslinked thermoplastic is not always sufficient in a balance of elastomeric properties, tensile strength, low-temperature properties and surface strength.

The present inventors have earnestly studied to solve such problems as mentioned above. As a result, they have found that a thermoplastic elastomer composition, which is obtained by dynamically heat treating, in the presence of an organic peroxide, a blend comprising a crystalline polyolefin resin and an unsaturated olefin copolymer obtained by random copolymerizing ethylene, an α-olefin of 3 to 20 carbon atoms and a specific conjugated diene monomer, or a blend further comprising at least one component selected from the group consisting of an ethylene/α-olefin/nonconjugated polyene copolymer, a peroxide-noncrosslinkable hydrocarbon rubber and a softener in addition to the crystalline polyolefin resin and the unsaturated olefin copolymer, has excellent elastomeric properties and moldability and that a composition comprising this thermoplastic elastomer composition and a crystalline polyolefin resin also has excellent elastomeric properties and moldability. Based on the finding, the present invention has been accomplished.

OBJECT OF THE INVENTION

The present invention is intended to solve such problems associated with the prior art as described above, and it is an object of the invention to provide olefin thermoplastic elastomer compositions having excellent moldability and capable of providing molded products having excellent elastomeric properties and tensile strength properties.

SUMMARY OF THE INVENTION

The first olefin thermoplastic elastomer composition according to the invention is a composition obtained by dynamically heat treating a blend in the presence of an organic peroxide, said blend comprising:

(A) a crystalline polyolefin resin in an amount of 10 to 60 parts by weight, and (B-1) an unsaturated olefin copolymer of at least one α-olefin of 2 to 20 carbon atoms and a conjugated diene monomer represented by the following formula (I), in an amount of 40 to 90 parts by weight, the total amount of said components (A) and (B-1) being 100 parts by weight;

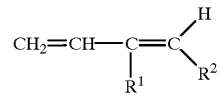

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

The second olefin thermoplastic elastomer composition according to the invention is a composition obtained by dynamically heat treating a blend in the presence of an organic peroxide, said blend comprising:

(A) a crystalline polyolefin resin in an amount of 10 to 60 parts by weight, and (B-2) an unsaturated olefin copolymer of at least one α-olefin of 2 to 20 carbon atoms, a conjugated diene monomer represented by the above formula (I) and an aromatic vinyl compound, in an amount of 40 to 90 parts by weight, the total amount of said components (A) and (B-2) being 100 parts by weight.

The first olefin thermoplastic elastomer composition of the invention can further contain the following optional components (C), (D) and (E), and the thermoplastic elastomer composition of three-component, four-component or five-component system is as follows:

a thermoplastic elastomer composition obtained by heat treating a blend in the presence of an organic peroxide, said blend comprising:

(A) the crystalline polyolefin resin in an amount of 10 to 60 parts by weight, (B-1) the unsaturated olefin copolymer in an amount of 10 to 85 parts by weight, and at least one component selected from the group consisting of (C) an ethylene/α-olefin/nonconjugated polyene copolymer in an amount of 1 to 50 parts by weight, (D) a peroxide-noncrosslinkable hydrocarbon rubber in an amount of 1 to 20 parts by weight and (E) a softener in an amount of 1 to 40 parts by weight, the total amount of said components (A), (B-1), and at least one of (C), (D) and (E) being 100 parts by weight.

The second olefin thermoplastic elastomer composition of the invention can further contain the following optional components (C), (D) and (E), and the thermoplastic elastomer composition of three-component, four-component or five-component system is as follows:

a thermoplastic elastomer composition obtained by heat treating a blend in the presence of an organic peroxide, said blend comprising:

(A) the crystalline polyolefin resin in an amount of 10 to 60 parts by weight, (B-2) the unsaturated olefin copolymer in an amount of 10 to 85 parts by weight, and at least one component selected from the group consisting of (C) an ethylene/α-olefin/nonconjugated polyene copolymer in an amount of 1 to 50 parts by weight, (D) a peroxide-noncrosslinkable hydrocarbon rubber in an amount of 1 to 20 parts by weight and (E) a softener in an amount of 1 to 40 parts by weight, the total amount of said components (A), (B-2), and at least one of (C), (D) and (E) being 100 parts by weight.

In the present invention, it is preferable that the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, and (b) the content of the constituent units derived from the conjugated diene monomer is in the range of 0.01 to 30% by mol.

It is particularly preferable that five-membered rings are present in the main chain of the unsaturated olefin copolymer (B-1) and that the quantity ratio of the double bonds from all of the addition units to the five-membered rings (total of double bonds from all addition units/five-membered rings) is in the range of 20/80 to 90/10.

In the present invention, it is preferable that the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, and (b) the content of the constituent units derived from the conjugated diene monomer is in the range of 0.01 to 30% by mol.

It is particularly preferable that five-membered rings are present in the main chain of the unsaturated olefin copolymer (B-2) and that the quantity ratio of the double bonds from all of the addition units to the five-membered rings (total of double bonds from all addition units/five-membered rings) is in the range of 20/80 to 90/10.

The unsaturated olefin copolymers (B-1) and (B-2) preferably have an intrinsic viscosity ($\eta$), as measured in decalin at 135° C., of 0.1 to 10 dl/g.

The unsaturated olefin copolymers (B-1) and (B-2) preferably have an iodine value of 1 to 50.

As the conjugated diene monomer for forming the unsaturated olefin copolymers (B-1) and (B-2), 1,3-butadiene or isoprene is preferably employed.

The first olefin thermoplastic elastomer composition of the invention is preferably a composition obtained by dynamically heat treating a blend in the presence of an organic peroxide, said blend comprising:

(A) a crystalline polyolefin resin in an amount of 10 to 60 parts by weight, and (B-1) an unsaturated olefin copolymer of ethylene, at least one α-olefin of 3 to 20 carbon atoms and a conjugated diene monomer represented by the formula (I), in an amount of 40 to 90 parts by weight, the total amount of said components (A) and (B-1) being 100 parts by weight;

wherein the degree of oil swelling of the olefin thermoplastic elastomer composition is not more than 90% based on the degree of oil swelling of a thermoplastic elastomer composition containing an ethylene/α-olefin/5-ethylidene-2-norbornene copolymer (X), said latter thermoplastic elastomer composition being obtained by dynamically heat treating, in the presence of an organic peroxide, a blend obtained by the same formulation as that of the blend for the former olefin thermoplastic elastomer composition except for using the ethylene/α-olefin/5-ethylidene-2-norbornene (X) whose intrinsic viscosity ($\eta$) as measured in decalin at 135° C., iodine value and ethylene content are in the ranges of ±10% of values of the intrinsic viscosity ($\eta$), the iodine value and the ethylene content of the unsaturated olefin copolymer (B-1), respectively, and whose α-olefin is the same α-olefin of 3 to 20 carbon atoms as that of the unsaturated olefin copolymer (B-1).

The second olefin thermoplastic elastomer composition of the invention is preferably a composition obtained by dynamically heat treating a blend in the presence of an organic peroxide, said blend comprising:

(A) a crystalline polyolefin resin in an amount of 10 to 60 parts by weight, and (B-2) an unsaturated olefin copolymer of ethylene, at least one α-olefin of 3 to 20 carbon atoms, a conjugated diene monomer represented by the formula (I) and an aromatic vinyl compound, in an amount of 40 to 90 parts by weight, the total amount of said components (A) and (B-2) being 100 parts by weight;

wherein the degree of oil swelling of the olefin thermoplastic elastomer composition is not more than 90% based on the degree of oil swelling of a thermoplastic elastomer composition containing an ethylene/α-olefin/5-ethylidene-2-norbornene/aromatic vinyl compound copolymer (X), said latter thermoplastic elastomer composition being obtained by dynamically heat treating, in the presence of an organic peroxide, a blend obtained by the same formulation as that of the blend for the former olefin thermoplastic elastomer composition except for using the ethylene/α-olefin/5-ethylidene-2-norbornene/aromatic vinyl compound copolymer (X) whose intrinsic viscosity (η) as measured in decalin at 135° C., iodine value, and contents of ethylene and the aromatic vinyl compound are in the ranges of ±10% of values of the intrinsic viscosity (η), the iodine value, and contents of ethylene and the aromatic vinyl compound of the unsaturated olefin copolymer (B-2), respectively, and whose α-olefin and aromatic vinyl compound are the same α-olefin of 3 to 30 carbon atoms and aromatic vinyl compound as that of the unsaturated olefin copolymer (B-2), respectively.

The third olefin thermoplastic elastomer composition according to the invention is a composition comprising:

the first or the second olefin thermoplastic elastomer composition in an amount of 100 parts by weight, and (F) a crystalline polyolefin resin in an amount of 5 to 200 parts by weight.

As the crystalline polyolefin resin (F), a resin identical with the crystalline polyolefin resin (A) can be employed.

DETAILED DESCRIPTION OF THE INVENTION

The olefin thermoplastic elastomer compositions according to the invention are described in detail hereinafter.

The first and the second olefin thermoplastic elastomer compositions according to the invention are each obtained by dynamically heat treating, in the presence of an organic peroxide, a blend comprising (A) a crystalline polyolefin resin, (B) a specific unsaturated olefin copolymer, and optionally, at least one component selected from the group consisting of (C) an ethylene/α-olefin/nonconjugated diene copolymer, (D) a peroxide-noncrosslinkable hydrocarbon rubber and (E) a softener.

First, the components are described below.

(A) Crystalline Polyolefin Resin

The crystalline polyolefin resin (A) for use in the invention is a homopolymer or copolymer of an α-olefin of 2 to 20 carbon atoms.

Examples of the α-olefins include ethylene, propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene.

These α-olefins can be used singly or in combination.

Examples of the crystalline polyolefin resins (A) include the following (co)polymers:

(1) an ethylene homopolymer (produced by any of low-pressure and high-pressure processes), (2) a copolymer of ethylene and not more than 10% by mol of another α-olefin or a vinyl monomer such as vinyl acetate or ethyl acrylate, (3) a propylene homopolymer, (4) a random copolymer of propylene and not more than 10% by mol of another α-olefin, (5) a block copolymer of propylene and not more than 30% by mol of another α-olefin, (6) a 1-butene homopolymer, (7) a random copolymer of 1-butene and not more than 10% by mol of another α-olefin, (8) a 4-methyl-1-pentene homopolymer, and (9) a random copolymer of 4-methyl-1-pentene and not more than 20% by mol of another α-olefin.

Of the above (co)polymers, (3) the propylene homopolymer, (4) the random copolymer of propylene and not more than 10% by mol of another α-olefin or (5) the block copolymer of propylene and not more than 30% by mol of another α-olefin is particularly preferably used as the crystalline polyolefin resin (A).

The crystalline polyolefin resin (A) desirably has a melt flow rate (MFR; ASTM D 1238, 230° C., load of 2.16 kg) of 0.1 to 100 g/10 min, preferably 0.3 to 60 g/10 min.

In the thermoplastic elastomer composition of two-component system comprising the crystalline polyolefin resin (A) and the unsaturated olefin copolymer (B-1) or (B-2), the crystalline polyolefin resin (A) is used in an amount of 10 to 60 parts by weight, preferably 15 to 50 parts by weight, based on 100 parts by weight of the total of the crystalline polyolefin resin (A) and the unsaturated olefin copolymer (B-1) or (B-2).

In the thermoplastic elastomer composition of three-component, four-component or five-component system comprising the crystalline polyolefin resin (A), the unsaturated olefin copolymer (B-1) or (B-2) and at least one of the ethylene/α-olefin/nonconjugated polyene copolymer (C), the peroxide-noncrosslinkable hydrocarbon rubber (D) and the softener (E), the crystalline polyolefin resin (A) is used in an amount of 10 to 60 parts by weight, preferably 15 to 50 parts by weight, based on 100 parts by weight of the total of the component (A), the component (B-1) or (B-2), and at least one of the component (C), the component (D) and the componet (E).

(B) Unsaturated Olefin Copolvmer

The unsaturated olefin copolymer (B) for use in the invention includes an unsaturated olefin copolymer (B-1) and an unsaturated olefin copolymer (B-2).

The unsaturated olefin copolymer (B-1) is a copolymer rubber of at least one α-olefin of 2 to 20 carbon atoms and a conjugated diene monomer.

The unsaturated olefin copolymer (B-2) is a copolymer rubber of at least one α-olefin of 2 to 20 carbon atoms, a conjugated diene monomer and an aromatic vinyl compound.

There is no specific limitation on the α-olefin, as far as the α-olefin has 2 to 20 carbon atoms. The α-olefin may be straight-chain or may have a branch.

Examples of the α-olefins include ethylene, propylene, 1-butene, 2-butene, 1-pentene, 1-hexene, 1-heptene, 1-octene, 1-decene, 1-undecene, 1-dodecene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-tetradecene, 1-hexadecene, 1-octadecene and 1-eicosene. Of these, preferably used is α-olefin of 3 to 12 carbon atoms such as propylene, 1-butene, 1-hexene and 1-octene.

These α-olefins can be used singly or in combination of two or more kinds. Especially when two kinds of the α-olefins are used in combination, a combination of ethylene and an α-olefin of 3 to 5 carbon atoms is preferable.

The conjugated diene monomer is represented by the following formula (I):

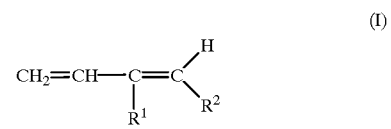

wherein $R^1$ and $R^2$ are each independently a hydrogen atom, an alkyl group of 1 to 8 carbon atoms or an aryl group, and at least one of $R^1$ and $R^2$ is a hydrogen atom.

Examples of the conjugated diene monomers include 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1, 3-butadiene, 2-hexyl-1,3-butadiene, 2-heptyl-1,3-butadiene, 2-octyl-1,3-butadiene and 2-phenyl-1,3-butadiene. Of these, 1,3-butadiene and isoprene are particularly preferable because they have excellent copolymerizability. The conjugated diene monomers can be used singly or in combination of two or more kinds.

Examples of the aromatic vinyl compounds include styrene, allylbenzene, 4-phenyl-1-butene, 3-phenyl-1-butene, 4-(4-methylphenyl)-1-butene, 4-(3-methylphenyl)-1-butene, 4-(2-methylphenyl)-1-butene, 4-(4-ethylphenyl)-1-butene, 4-(4-butylphenyl)-1-butene, 5-phenyl-1-pentene, 4-phenyl-1-pentene, 3-phenyl-1-pentene, 5-(4-methylphenyl)-1-pentene, 4-(2-methylphenyl)-1-pentene, 3-(4-methylphenyl)-1-pentene, 6-phenyl-1-hexene, 5-phenyl-1-hexene, 4-phenyl-1-hexene, 3-phenyl-1-hexene, 6-(4-methylphenyl)-1-hexene, 5-(2-methylphenyl)-1-hexene, 4-(4-methylphenyl)-1-hexene, 3-(2-methylphenyl)-1-hexene, 7-phenyl-1-heptene, 6-phenyl-1-heptene, 5-phenyl-1-heptene, 4-phenyl-1-heptene, 8-phenyl-1-octene, 7-phenyl-1-octene, 6-phenyl-1-octene, 5-phenyl-1-octene, 4-phenyl-1-octene, 3-phenyl-1-octene and 10-phenyl-1-decene. Of the aromatic vinyl compounds, preferably used are styrene, allylbenzene and 4-phenyl-1-butene, and particularly preferably used are styrene and 4-phenyl-1-butene.

These aromatic vinyl compounds can be used singly or in combination of two or more kinds.

In the present invention, nonconjugated dienes and nonconjugated trienes, such as ethylidene norbornene and dicyclopentadiene, can be copolymerized in amounts as being not detrimental to the object of the invention.

In the unsaturated olefin copolymer (B-1), the constituent units derived from the α-olefin of 2 to 20 carbon atoms and the constituent units derived from the conjugated diene monomer are arranged at random and bonded to each other. This copolymer has double bonds derived from the conjugated diene monomer, and the main chain of the copolymer is substantially linear.

In the unsaturated olefin copolymer (B-2), the constituent units derived from the α-olefin of 2 to 20 carbon atoms, the constituent units derived from the conjugated diene monomer and the constituent units derived from the aromatic vinyl compound are arranged at random and bonded to each other. This copolymer has double bonds derived from the conjugated diene monomer, and the main chain of the copolymer is substantially linear.

The substantially gel-free linear structure of the above copolymers can be confirmed by the fact that they are dissolved in an organic solvent and substantially contain no insolubles. For example, the above structure can be confirmed by the fact that they are completely dissolved in decalin at 135° C. in the measurement of intrinsic viscosity (η).

The unsaturated olefin copolymer (B-1) for use in the invention contains:
constituent units derived from the α-olefin of 2 to 20 carbon atoms, preferably
constituent units of 1,2-addition units (including 3,4-addition units) and 1,4-addition units derived from the conjugated diene, and more preferably
constituent units of five-membered rings (cyclopentane rings) formed in the main chain.

The unsaturated olefin copolymer (B-1) may further contain cyclopropane constituent units in addition to the above-mentioned constituent units.

The unsaturated olefin copolymer (B-2) for use in the invention contains:
constituent units derived from the α-olefin of 2 to 20 carbon atoms,
constituent units derived from the aromatic vinyl compound, preferably
constituent units of 1,2-addition units (including 3,4-addition units) and 1,4-addition units derived from the conjugated diene, and more preferably
constituent units of five-membered rings (cyclopentane rings) formed in the main chain.

The unsaturated olefin copolymer (B-2) may also further contain cyclopropane constituent units in addition to the above-mentioned constituent units.

In the unsaturated olefin copolymer (B) preferably used in the invention, the molar ratio of the constituent units derived from ethylene to the constituent units derived from the α-olefin of 3 to 20 carbon atoms (ethylene/α-olefin) is in the range of 99/1 to 40/60 (total: 100). In consideration of possibility of lowering the glass transition temperature Tg of the resulting copolymer, the molar ratio is in the range of preferably 90/10 to 60/40 (total: 100), and in consideration of the relation between activity and Tg of the resulting copolymer, the molar ratio is in the rage of more preferably 85/15 to 70/30 (total: 100).

In the unsaturated olefin copolymer (B-2) preferably used in the invention, the molar ratio of the total of the constituent units derived from the α-olefin of 2 to 20 carbon atoms, preferably the constituent units derived from ethylene and the constituent units derived from the α-olefin of 3 to 20 carbon atoms to the constituent units derived from the aromatic vinyl compound (α-olefin/aromatic vinyl compound, preferably ethylene+α-olefin/aromatic vinyl compound) is in the range of 99.5/0.5 to 50/50, preferably 99.0/1.0 to 70/30, more preferably 98.0/2.0 to 85/15.

The unsaturated olefin copolymer (B) further has the following properties.

(a) In the unsaturated olefin copolymer (B), the 1,2-addition units (including 3,4-addition units) derived from the conjugated diene monomer form double bonds in the side chain of the copolymer, and the 1,4-addition units derived from the conjugated diene monomer form double bonds of cis or trans form in the main chain of the copolymer.

In the copolymer, the double bonds of the side chain derived from the 1,2-addition units (including 3,4-addition units) and the double bonds of the main chain derived from the 1,4-addition units are desirably present in such amounts that the molar ratio of the double bonds of the side chain derived from the 1,2-addition units to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, preferably 10/90 to 99/1. When the conjugated diene monomer is a conjugated diene monomer having the formula (I) wherein $R^1$ is a hydrogen atom and $R^2$ is a hydrogen atom or an alkyl group (e.g., butadiene), the above ratio is more preferably in the range of 12/88 to 90/10. When the conjugated diene monomer is a conjugated diene monomer having the formula (I) wherein $R^1$ is an alkyl group and $R^2$ is a hydrogen atom (e.g., isoprene), the above ratio is more preferably in the range of 20/80 to 90/10. If the double bonds are present in the copolymer in the above-mentioned ratio, the copolymer is improved in the weathering resistance, heat resistance, crosslinking efficiency, low-temperature resistance and modification efficiency.

(b) The content of the constituent units derived from the conjugated diene monomer is, for example, in the range of 0.01 to 30% by mol, preferably 0.1 to 15% by mol.

(c) In the main chain of the copolymer, five-membered rings (cyclopentane rings) formed together with at least two adjacent carbon atoms of the copolymer main chain may be present, and the double bonds from all of the addition units and the five-membered rings are desirably present in such amounts that the molar ratio of the double bonds from all of the addition units to the five-membered rings (total of double bonds from all of the addition units/five-membered rings) becomes 20/80 to 90/10, preferably 30/70 to 80/20, in consideration of balance between the glass transition temperature Tg and the iodine value of the resulting copolymer.

The five-membered rings which may be present in the unsaturated olefin copolymer (B) include cis form and trans form.

The mechanism of production of the five-membered ring has not been made clear yet, but it is presumed that to an oligomer chain or a prepolymer chain that is formed by the reaction of the α-olefin (e.g., ethylene) with the conjugated diene monomer (e.g., 1,3-butadiene), a conjugated diene is added through 1,2-addition or 3,4-addition reaction and then ethylene (α-olefin) is further added, followed by intramolecular cyclization, whereby a five-membered ring is produced.

The cyclopropane ring (three-membered ring) is presumed to be produced by intramolecular cyclization after 1,2-addition of the conjugated diene (e.g., butadiene) to the oligomer chain or the prepolymer chain. The five-membered ring and the cyclopropane ring are considered to contribute to improvement of compatibility of the resulting copolymer.

The production ratio by mol of the cyclopropane rings to the five-membered rings (cyclopropane ring/five-membered ring) is in the range of preferably 0.1/99.9 to 50/50, more preferably 0.1/99.9 to 30/70.

When the unsaturated olefin copolymer (B) is an ethylene/propylene/styrene/1,3-butadiene copolymer, identification of the copolymer can be made by measuring NMR using a hexachlorobutadiene solvent under the conditions of 110° C. and 100 MHz by means of a NMR measuring apparatus (manufactured by Japan Electron Optics Laboratory Co., Ltd.), and identification of the structures of the 1,4-addition unit and the five-membered ring can be made on the resulting chart by means of chemical shifts described in "Makromol. Chem." 192, 2591–2601 (1991).

Identification and quantitative determination of the following 1,2-addition unit can be made by $^1$H-NMR, $^{13}$C-NMR and two-dimensional NMR of $^1$H and $^{13}$C.

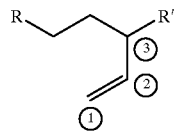

The chemical shift of each NMR is shown in Table 1.

TABLE 1

| | 1 | 2 | 3 |
|---|---|---|---|
| Chemical shift of $^{13}$C-NMR | 110–115 ppm, | 140–145 ppm, | 40–45 ppm |
| Chemical shift of $^1$H-NMR | 4.9–5.0 ppm, | 5.2–5.9 ppm, | 1.6–2.0 ppm |

Identification and quantitative determination of the following cyclopropane ring can be made by $^{13}$C-NMR and $^1$H-NMR similarly to the above and further by a C—H coupling constant that is inherent in the cyclopropane ring.

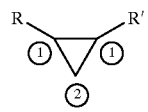

The chemical shift of each NMR is shown in Table 2.

TABLE 2

| | 1 | 2 |
|---|---|---|
| Chemical shift of $^{13}$C-NMR | 16–22 ppm | 10–15 ppm |
| Chemical shift of $^1$H-NMR | 0.2–0.4 ppm | 0.0–0.2 ppm |
| Coupling constant ($J_{CH}$) | 154 | 156 |

Identification of styrene can be made by use of chemical shift of "Makromol. Chem. Phys." 197, 1071–1083 (1996) and "Macromolecules" 28, 4665–4667 (1995).

The ratio between the components and the quantity ratio between the structures derived from the conjugated diene can be determined by the ratio between areas of the peaks in the $^1$H-NMR and/or the $^{13}$C-NMR.

In the present invention, it is desirable that the constituent units derived from the conjugated diene monomer, namely, 1,2-addition units (including 3,4-addition units), 1,4-addition units, five-membered rings (cyclopentane structure) and cyclopropane rings (three-membered rings), are contained in the copolymer in the total amount of 0.01 to 30% by mol, preferably 0.1 to 15% by mol. The residual constituent units are constituent units derived from ethylene, an α-olefin of 3 to 20 carbon atoms and the aromatic vinyl compound such as styrene.

The unsaturated olefin copolymer (B) desirably has an intrinsic viscosity (η), as measured in decalin at 135° C., of usually 0.1 to 10 dl/g, preferably 1.0 to 5.0 dl/g. The unsaturated olefin copolymer (B) desirably has an iodine value of usually 1 to 50, preferably 3 to 50, more preferably 5 to 40.

The unsaturated olefin copolymer (B) has a melting point (Tm), as measured by DSC, of preferably not higher than 120° C., more preferably not higher than 110° C., further preferably not higher than 70° C., still more preferably not higher than 40° C. The glass transition temperature Tg of the copolymer, as measured by DSC, is preferably not higher than 25° C., more preferably not higher than 10° C., still more preferably not higher than 0° C. The Mw/Mn value of the copolymer, as measured by GPC, is preferably not more than 3.

In the present invention, it is preferable that at least one of the molar ratio between the constituent units, the intrinsic viscosity (η) and the iodine value of the unsaturated olefin copolymer (B) is within the above range, it is more preferable that two or more of them are within the above ranges, and it is particularly preferable that all of them are within the above ranges.

Since the unsaturated olefin copolymer (B) uses the above-described conjugated diene monomer as a copolymerizable component, the copolymer has high crosslinking efficiency, and therefore crosslinking reaction proceeds tightly even by a small amount of an organic peroxide, whereby good balance between moldability of the composition and elastomeric properties of the molded product can be obtained.

The olefin thermoplastic elastomer composition of the invention containing the unsaturated olefin copolymer (B), particularly an ethylene/$C_{3-20}$ α-olefin/conjugated diene copolymer (B-1) having a melting point (Tm) of not higher than 40° C., has a degree of oil swelling of preferably not more than 90%, more preferably not more than 85%, based on the degree of oil swelling of another thermoplastic elastomer composition containing an ethylene/α-olefin/5-ethylidene-2-norbornene copolymer (X; corresponding to the later-described component (C)) which has the same intrinsic viscosity (η), iodine value and ethylene content as those of the copolymer (B) and contains the same α-olefin as that of the copolymer (B). The degree of oil swelling is an indication of the crosslinking reactivity and is measured in the manner described below.

The expression "the copolymer (X) has the same intrinsic viscosity (η), iodine value and ethylene content as those of the copolymer (B)" used herein means that the intrinsic viscosity (η), the iodine value and the ethylene content of the ethylene/α-olefin/5-ethylidene-2-norbornene copolymer (X) are within the ranges of ±10% of values of the intrinsic viscosity (η), the iodine value and the ethylene content respectively, of the unsaturated olefin copolymer (B) for use in the invention.

Here is described the case that the copolymer (B-1) is employed for the composition. The above description is applicable in the case that a composition containing an ethylene/α-olefin/conjugated diene/aromatic vinyl compound copolymer (B-2) is employed, provided that a composition used for the basis for the degree of oil swelling contains a ethylene/α-olefin/5-ethylidene-2-norbornene/aromatic vinyl compound copolymer, in which a content of the aromatic vinyl compound is also within the range of ±10% of that of the copolymer (B-2).

If a monomer other than the conjugated diene monomer, for example, a nonconjugated polyene monomer such as a nonconjugated diene (e.g., dicyclopentadiene) or a nonconjugated triene, is copolymerized in the ethylene/α-olefin/conjugated diene copolymer for use in the invention, an ethylene/α-olefin/5-ethylidene-2-norbornene copolymer (X) wherein said monomer other than the conjugated diene monomer is copolymerized is used to measure the degree of oil swelling.

In the measurement of the degree of oil swelling, as described above, a thermoplastic elastomer composition containing the unsaturated olefin copolymer (B) and a thermoplastic elastomer composition to be compared containing, for example, the ethylene/α-olefin/5-ethylidene-2-norbornene copolymer (X) are prepared in the same component ratio at the same resin temperature, and they are measured in the degree of oil swelling in the following manner.

From a square plate of the thermoplastic elastomer composition, a specimen of 2×10×10 mm is punched out, and an initial volume (VO) of the specimen is measured by the use of a volume measuring device of water immersion type. Then, the specimen is immersed in an oil of JIS No. 1 having been heated to 70° C. for three days. The temperature of the specimen is returned to room temperature, and the volume (V) of the specimen is measured in the same manner as above. Using the obtained values, the degree of oil swelling (ΔV) is calculated from the following equation.

ΔV(%)={(V−VO)/VO}×100

The proportion of the degree of oil swelling (ΔV1) of the thermoplastic elastomer composition containing the unsaturated olefin copolymer (B) to the degree of oil swelling (ΔV2) of the thermoplastic elastomer composition containing the ethylene/α-olefin/5-ethylidene-2-norbornene copolymer (X) for comparison. ((ΔV1/ΔV2)×100 (%)) tends to be decreased as the quantity ratio of the unsaturated olefin copolymer (B) to the components other than the crystalline polyolefin resin (A) in the thermoplastic elastomer composition is increased.

In the thermoplastic elastomer composition of two-component system comprising the crystalline polyolefin resin (A) and the unsaturated olefin copolymer (B-1) or (B-2), the unsaturated olefin copolymer (B) is used in an amount of 40 to 90 parts by weight, preferably 50 to 85 parts by weight, based on 100 parts by weight of the total of the crystalline polyolefin resin (A) and the unsaturated olefin copolymer (B-1) or (B-2).

In the thermoplastic elastomer composition of three-component, four-component or five-component system comprising the crystalline polyolefin resin (A), the unsaturated olefin copolymer (B-1) or (B-2) and at least one of the ethylene/α-olefin/nonconjugated polyene copolymer (C), the peroxide-noncrosslinkable hydrocarbon rubber (D) and the softener (E), the unsaturated olefin copolymer (B) is used in an amount of 10 to 85 parts by weight, preferably 15 to 65 parts by weight, based on 100 parts by weight of the total of the component (A), the component (B-1) or (B-2), and at least one of the component (C), the component (D) and the component (E).

Preparation of Unsaturated Olefin Copolymer (B)

The unsaturated olefin copolymer (B) for use in the invention can be obtained by copolymerizing, preferably random copolymerizing the α-olefin of 2 to 20 carbon atoms, the conjugated diene monomer represented by the formula (I), and optionally, the aromatic vinyl compound, in the presence of the below-described metallocene catalyst.

The metallocene catalyst employable herein is at least one catalyst comprising a transition metal complex (a) represented by the following formula (II) or (III) and at least one compound selected from the compounds (b), (c) and (d) described below.

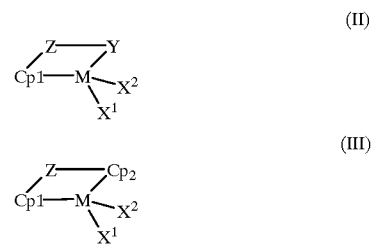

In the formulas (II) and (III), M is Ti, Zr, Hf, Rn, Nd, Sm or Ru; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is C, O, B, S, Ge, Si, Sn or a group containing any of these atoms.

The compounds (b), (c) and (d) are as follows:

(b) a compound which reacts with the transition metal M in the component (a) to form an ionic complex, (c) an organoaluminum compound, and (d) aluminoxane.

The transition metal complex (a) for use in the invention, which is represented by the following formula (II), is described below.

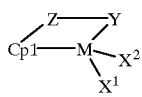

(II)

wherein M is a transition metal of Group 4 or lanthanum series of the periodic table, specifically Ti, Zr, Hf, Rn, Nd, Sm or Ru, preferably Ti, Zr or Hf; Cp1 is a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; Z is carbon, oxygen, sulfur, boron or an element of Group 14 of the periodic table (e.g., silicon, germanium or tin), preferably carbon, oxygen or silicon, and Z may have a substituent; and Z and Y may together form a condensed ring.

In more detail, Cp1 is a ligand coordinated to the transition metal and is a ligand having cyclopentadienyl skeleton, such as a cyclopentadienyl group, an indenyl group, a fluorenyl group or any of their derivatives. The ligand having cyclopentadienyl skeleton may have a substituent, such as an alkyl group, a cycloalkyl group, a trialkylsilyl group or a halogen atom.

Z is an atom selected from C, O, B, S, Ge, Si and Sn, and may have a substituent, such as an alkyl group or an alkoxy group. The substituents of Z may be bonded to each other to form a ring.

$X^1$ and $X^2$ are each an anionic ligand or a neutral Lewis base ligand, they may be the same or different, and they are each a hydrogen atom, a halogen atom, a hydrocarbon group, a silyl group or a germyl group, having 20 or less carbon atoms, silicon atoms or germanium atoms.

Examples of the compounds represented by the formula (II) include:
- (dimethyl(t-butylamido)(tetramethyl-$\eta^5$-cyclopentadienyl)silylene)titanium dichloride,
- ((t-butylamido)(tetramethyl-$\eta^5$-cyclopentadienyl)-1,2-ethanediyl)titanium dichloride,
- (dimethyl(phenylamido)(tetramethyl-$\eta^5$-cyclopentadienyl)silylene)titanium dichloride,
- (dimethyl(t-butylamido)(tetramethyl-$\eta^5$-cyclopentadienyl)silylene)titanium dimethyl,
- (dimethyl(4-methylphenylamido)(tetramethyl-$\eta^5$-cyclopentadienyl)silylene)titanium dichloride,
- (dimethyl(t-butylamido)($\eta^5$-cyclopentadienyl)silylene) titanium dichloride, and
- (tetramethyl(t-butylamido)(tetramethyl-$\eta^5$-cyclopentadienyl)disilylene)titanium dichloride.

Also employable in the invention is a transition metal compound represented by the following formula (III):

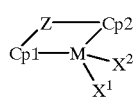

(III)

wherein M is Ti, Zr, Hf, Rn, Nd, Sm or Ru, preferably Ti, Zr or Hf; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; and Z is C, O, B, S, Ge, Si, Sn or a group containing any of these atoms.

In the formula (III), the bonding group Z is preferably one atom selected from C, O, B, S, Ge, Si and Sn, and this atom may have a substituent, such as an alkyl group or an alkoxy group. The substituents of Z may be bonded to each other to form a ring.

Cp1 and Cp2 are each a ligand coordinated to the transition metal and are each a ligand having cyclopentadienyl skeleton, such as a cyclopentadienyl group, an indenyl group, a 4,5,6,7-tetrahydroindenyl group or a fluorenyl group. The ligand having cyclopentadienyl skeleton may have a substituent, such as an alkyl group, a cycloalkyl group, a trialkylsilyl group or a halogen atom.

$X^1$ and $X^2$ are each an anionic ligand or a neutral Lewis base ligand, specifically, an alkoxy group, an aryloxy group or a hydrocarbon group of 1 to 12 carbon atoms, a sulfonic acid-containing group (—$SO_3$Ra wherein Ra is an alkyl group, an alkyl group substituted with a halogen atom, an aryl group, an aryl group substituted with a halogen atom, or an aryl group substituted with an alkyl group), a halogen atom or a hydrogen atom.

Examples of the metallocene compounds containing zirconium as M and containing two ligands having cyclopentadienyl skeleton include:
- cyclohexylidene-bis(indenyl)dimethylzirconium,
- cyclohexylidene-bis(indenyl)zirconium dichloride,
- isopropylidene-bis(indenyl)zirconium dichloride,
- isopropylidene (cyclopentadienyl-fluorenyl)zirconium dichloride,
- diphenylsilylene-bis(indenyl)zirconium dichloride,
- methylphenylsilylene-bis (indenyl)zirconium dichloride,
- rac-dimethylsilylene-bis(2-methyl-1-indenyl)zirconium dichloride,
- rac-dimethylsilylene-bis(4,7-dimethyl-1-indenyl) zirconium dichloride,
- rac-dimethylsilylene-bis(2,4,7-trimethyl-1-indenyl) zirconium dichloride,
- rac-dimethylsilylene-bis(2,4,6-trimethyl-1-indenyl) zirconium dichloride,
- rac-dimethylsilylene-bis(4-phenyl-1-indenyl)zirconium dichloride,
- rac-dimethylsilylene-bis(2-methyl-4-phenyl-1-indenyl) zirconium dichloride,
- rac-dimethylsilylene-bis(2-methyl-4-(α-naphthyl)-1-indenyl)zirconium dichloride,
- rac-dimethylsilylene-bis(2-methyl-4-(β-naphthyl)-1-indenyl)zirconium dichloride, and
- rac-dimethylsilylene-bis(2-methyl-4-(1-anthryl)-1-indenyl)zirconium dichloride.

There can be also exemplified metallocene compounds wherein zirconium is replaced with titanium or hafnium in the above compounds.

Further, a bridge type transition metal compound (metallocene compound) represented by the following formula (A) is also employable.

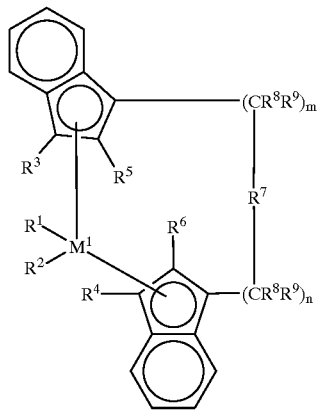
(A)

In the formula (A), $M^1$ is a metal of Group IVB of the periodic table, e.g., titanium, zirconium or hafnium.

$R^1$ and $R^2$ may be the same or different, and are each hydrogen, an alkyl group of 1 to 10, preferably 1 to 3 carbon atoms, an alkoxy group of 1 to 10, preferably 1 to 3 carbon atoms, an aryl group of 6 to 10, preferably 6 to 8 carbon atoms, an aryloxy group of 6 to 10, preferably 6 to 8 carbon atoms, an alkenyl group of 2 to 10, preferably 2 to 4 carbon atoms, an arylalkyl group of 7 to 40, preferably 7 to 10 carbon atoms, an alkylaryl group of 7 to 40, preferably 7 to 12 carbon atoms, an arylalkenyl group of 8 to 40, preferably 8 to 12 carbon atoms, or a halogen atom, preferably chlorine.

$R^3$ and $R^4$ may be the same or different, and are each hydrogen, a halogen atom, preferably fluorine, chlorine or bromine, an alkyl group of 1 to 10, preferably 1 to 4 carbon atoms which may be halogenated, an aryl group of 6 to 10, preferably 6 to 8 carbon atoms which may be halogenated, or a group of $-NR^{10}_2$, $-SR^{10}$, $-OSiR^{10}_3$, $-SiR^{10}_3$ or $-PR^{10}_2$, where $R^{10}$ is a halogen atom, preferably chlorine, an alkyl group of 1 to 10, preferably 1 to 3 carbon atoms, or an aryl group of 6 to 10, preferably 6 to 8 carbon atoms.

$R^3$ and $R^4$ are each particularly preferably hydrogen.

$R^5$ and $R^6$ may be the same or different, preferably the same, and are the same as described for $R^3$ and $R^4$ except that each of $R^5$ and $R^6$ is not hydrogen. $R^5$ and $R^6$ are each preferably an alkyl group of 1 to 4 carbon atoms which may be halogenated, for example, methyl, ethyl, propyl, isopropyl, butyl, isobutyl or trifluoromethyl, preferably methyl.

$R^7$ is

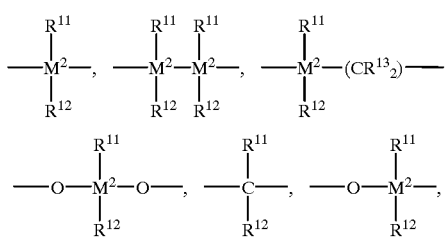

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, where $R^{11}$, $R^{12}$ and $R^{13}$ may be the same or different, and are each hydrogen, a halogen atom, an alkyl group of 1 to 10, preferably 1 to 4 carbon atoms, more preferably methyl, a fluoroalkyl group of 1 to 10 carbon atoms, preferably $CF_3$, an aryl group of 6 to 10, preferably 6 to 8 carbon atoms, a fluoroaryl group of 6 to 10 carbon atoms, preferably pentafluorophenyl, an alkoxy group of 1 to 10, preferably 1 to 4 carbon atoms, particularly preferably methoxy, an alkenyl group of 2 to 10, preferably 2 to 4 carbon atoms, an arylalkyl group of 7 to 40, preferably 7 to 10 carbon atoms, an arylalkenyl group of 8 to 40, preferably 8 to 12 carbon atoms, or an alkylaryl group of 7 to 40, preferably 7 to 12 carbon atoms, or $R^{11}$ and $R^{12}$, or $R^{11}$ and $R^{13}$ may form a ring together with the atoms to which they are bonded.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same or different, and are the same as described for $R^{11}$.

m and n may be the same or different, and are each 0, 1 or 2, preferably 0 or 1, and m+n is 0, 1 or 2, preferably 0 or 1.

Particularly preferred metallocene compounds satisfying the above conditions are compounds represented by the following formulas (i) to (iii).

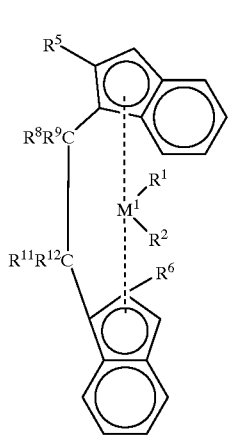
(i)

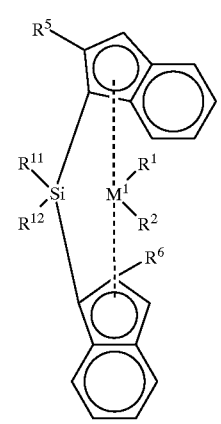
(ii)

-continued

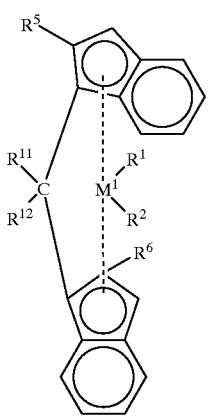
(iii)

In the above formulas (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{11}$ and $R^{12}$ are the same as each described above.

Of the compounds represented by the formulas (i), (ii) and (iii), particularly preferred are the following compounds:

rac-dimethylmethylene-bis(indenyl)zirconium dichloride,
rac-dimethylmethylene-bis(2-methyl-1-indenyl) zirconium dichloride,
rac-diphenylmethylene-bis(2-methyl-1-indenyl) zirconium dichloride,
rac-ethylene-(2-methyl-1-indenyl)$_2$zirconium dichloride,
rac-dimethylsilylene-(2-methyl-1-indenyl)$_2$zirconium dichloride,
rac-dimethylsilylene-(2-methyl-1-indenyl)$_2$zirconium dimethyl,
rac-ethylene-(2-methyl-1-indenyl)$_2$zirconium dimethyl,
rac-phenyl(methyl)silylene-(2-methyl-1-indenyl)$_2$zirconium dichloride,
rac-diphenyl-silylene-(2-methyl-1-indenyl)$_2$zirconium dichloride,
rac-methylethylene-(2-methyl-1-indenyl)$_2$zirconium dichloride, and
rac-dimethylsilylene-(2-ethyl-1-indenyl)$_2$zirconium dichloride.

These metallocene compounds can be prepared by conventionally known processes (see, for example, Japanese Patent Laid-Open Publication No. 268307/1992) (corresponding to EP 485822).

In the present invention, a bridge type transition metal compound (metallocene compound) represented by the following formula (B) is also employable.

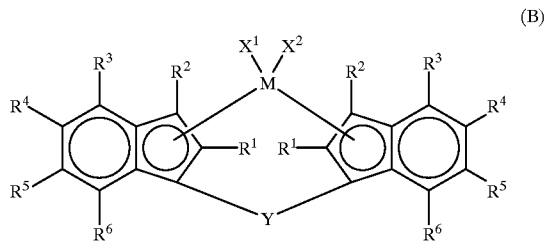
(B)

In the formula (B), M is a transition metal atom of Group IVB of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include the above-exemplified hydrocarbon groups which are substituted with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsililphenyl.

Examples of the oxygen-containing groups include hydroxy groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing group.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms (methyl, ethyl or propyl). $R^2$ is preferably hydrogen or a hydrocarbon group, particularly preferably hydrogen or a hydrocarbon group of 1 to 3 carbon atoms (methyl, ethyl or propyl).

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, preferred is hydrogen, the hydrocarbon group or the halogenated hydrocarbon group. At least one combination of $R^3$ and $R^4$, $R^4$ and $R^5$, or $R^5$ and $R^6$ may form a monocyclic aromatic ring together with the carbon atoms to which they are bonded.

When there are two or more hydrocarbon groups or halogenated hydrocarbon groups, excluding the groups for forming the aromatic ring, they may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are those described for $R^1$ and $R^2$.

As the ligand which contains a monocyclic aromatic ring formed by at least one combination of $R^3$ and $R^4$, $R^4$ and $R^5$, or $R^5$ and $R^6$, as mentioned above, and is coordinated to M, there can be mentioned the following ones.

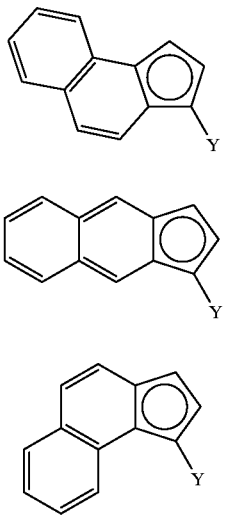

(1)

(2)

(3)

Of these, preferred is the ligand represented by the formula (1).

The aromatic ring mentioned above may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms for substituting the aromatic ring are those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are those described for $R^1$ and $R^2$.

Examples of the sulfur-containing groups include those described for $R^1$ and $R^2$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$—, where $R^7$ is hydrogen, a halogen atom, a hydrocarbon group of 1 to 20 carbon atoms or a halogenated hydrocarbon group of 1 to 20 carbon atoms.

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

Examples of the divalent halogenated hydrocarbon groups include the above-mentioned divalent hydrocarbon groups of 1 to 20 carbon atoms, which are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl) silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-mentioned divalent silicon-containing groups.

Examples of the divalent tin-containing groups include those wherein silicon is replaced with tin in the above-mentioned divalent silicon-containing groups.

$R^7$ is a halogen atom, a hydrocarbon group of 1 to 20 carbon atoms or a halogenated hydrocarbon group of 1 to 20 carbon atoms, examples of which are those described for $R^1$ and $R^2$.

Of the above groups, preferred are divalent silicon-containing groups, divalent germanium-containing groups and divalent tin-containing group, and more preferred are divalent silicon-containing groups. Of these, particularly preferred are alkylsilylene, alkylarylsilylene and arylsilylene.

Listed below are examples of the transition metal compounds represented by the formula (B).

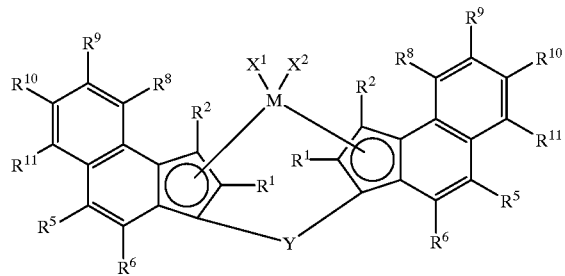

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(p-tolyl)₂ | Cl | Cl | Zr |
| CH₃ | H | H | H | H | H | H | H | Si(pClPh)₂ | Cl | Cl | Zr |
| CH₃ | H | H | H | H | H | H | H | C₂H₅ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| Ph | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh₂ | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | Ph | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | Ph | SiMe₂ | Cl | Cl | Zr |

*¹: R⁵ and R¹¹ are bonded to each other to form a five-membered ring.
Me: methyl;
Et: ethyl;
Ph: phenyl.

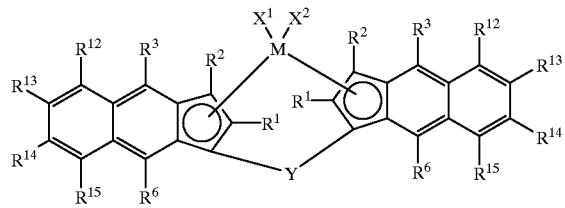

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²: R³ and R¹², and R⁶ and R¹⁵ are bonded to each other to form a five-membered ring, respectively.
Me: methyl;
Ph: phenyl

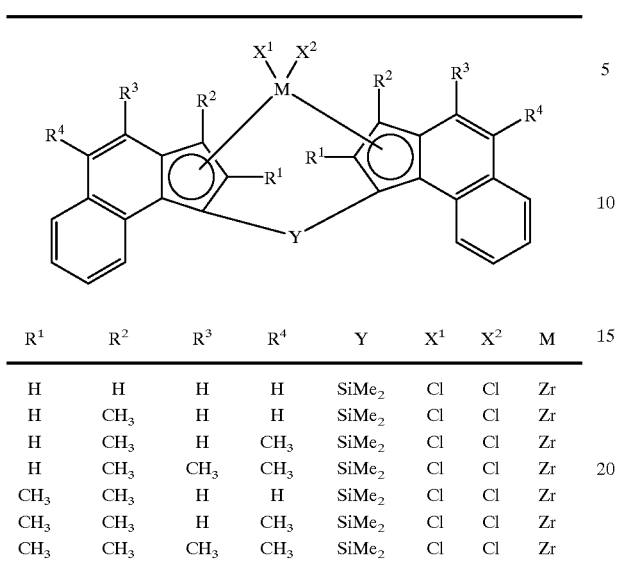

| $R^1$ | $R^2$ | $R^3$ | $R^4$ | Y | $X^1$ | $X^2$ | M |
|---|---|---|---|---|---|---|---|
| H | H | H | H | SiMe$_2$ | Cl | Cl | Zr |
| H | CH$_3$ | H | H | SiMe$_2$ | Cl | Cl | Zr |
| H | CH$_3$ | H | CH$_3$ | SiMe$_2$ | Cl | Cl | Zr |
| H | CH$_3$ | CH$_3$ | CH$_3$ | SiMe$_2$ | Cl | Cl | Zr |
| CH$_3$ | CH$_3$ | H | H | SiMe$_2$ | Cl | Cl | Zr |
| CH$_3$ | CH$_3$ | H | CH$_3$ | SiMe$_2$ | Cl | Cl | Zr |
| CH$_3$ | CH$_3$ | CH$_3$ | CH$_3$ | SiMe$_2$ | Cl | Cl | Zr |

Me: methyl.

Also employable in the invention are transition metal compounds wherein zirconium is replaced with titanium or hafnium in the above-mentioned compounds.

The transition metal compounds mentioned above are used generally in the form of racemic modification as the olefin polymerization catalyst component, but they can be used also in the form of R type or S type.

The indene derivative ligands for the transition metal compounds can be synthesized in accordance with ordinary organic synthesis through, for example, the reaction route described below.

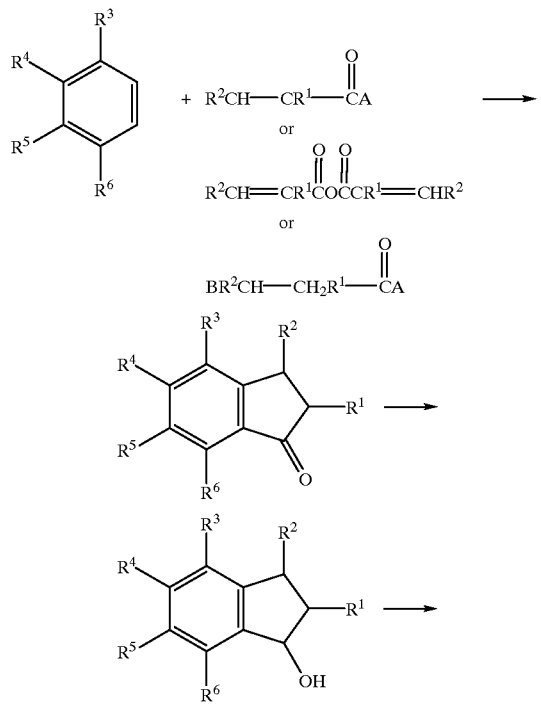

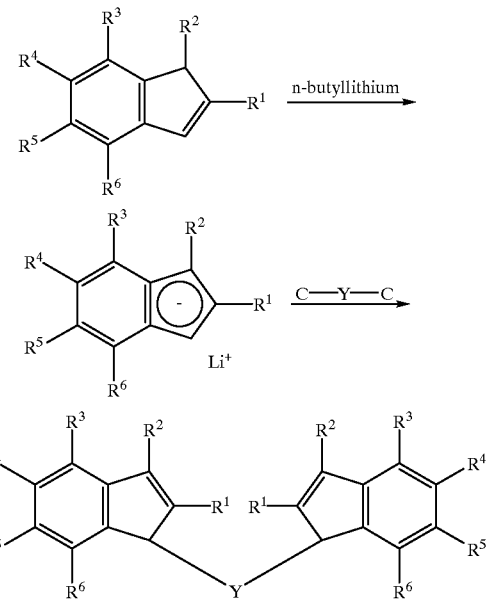

wherein A, B, C are each halogen.

The transition metal compounds used in the invention can be synthesized from these indene derivatives in accordance with conventionally known processes, for example, described in Japanese Patent Laid-Open Publication No. 268307/1992 (corresponding to EP 485822.

In the present invention, a bridge type transition metal compound (metallocene compound) represented by the following formula (C) is also employable.

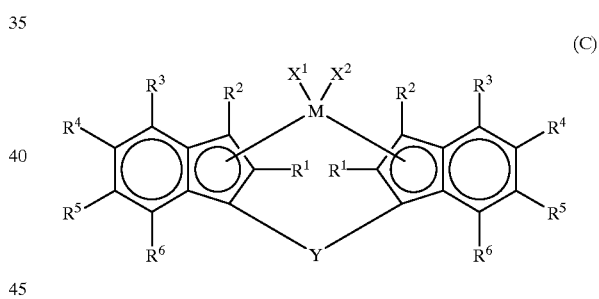

(C)

In the formula (C), M, $R^1$, $R^2$, $R^3$, $R^4$, $R^5$ and $R^6$ have the same as described for those in the aforesaid formula (B).

Of $R^3$, $R^4$, $R^5$ and $R^6$, at least two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and may be substituted with halogen atoms or silicon-containing groups. As the halogen atoms and the silicon-containing groups, there can be mentioned those substituents as described for $R^1$ and $R^2$.

Of the groups $R^3$, $R^4$, $R^5$ and $R^6$, other groups than the alkyl groups are each preferably hydrogen.

Examples of the hydrocarbon groups of 1 to 20 carbon atoms include chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic ring other than the aromatic ring.

Examples of the halogen atoms are those described for $R^1$ and $R^2$.

$X^1$, $X^2$, Y and $R^7$ have the same as described for those in the aforesaid formula (B).

Listed below are examples of the metallocene compounds (transition metal compounds) represented by the formula (C).

rac-Dimethylsilylene-bis(4,7-dimethyl-1-indenyl)zirconium dichloride,
rac-Dimethylsilylene-bis(2,4,7-trimethyl-1-indenyl)zirconium dichloride,
rac-Dimethylsilylene-bis(2,4,6-trimethyl-1-indenyl)zirconium dichloride,
rac-Dimethylsilylene-bis(2,5,6-trimethyl-1-indenyl)zirconium dichloride,
rac-Dimethylsilylene-bis(2,4,5,6-tetramethyl-1-indenyl)zirconium dichloride,
rac-Dimethylsilylene-bis(2,4,5,6,7-pentamethyl-1-indenyl)zirconium dichloride,
rac-Dimethylsilylene-bis(2-methyl-4-n-propyl-7-methyl-1-indenyl)zirconium dichloride,
rac-Dimethylsilylene-bis(4-i-propyl-7-methyl-1-indenyl)zirconium dichloride,
rac-Dimethylsilylene-bis(2-methyl-4-i-propyl-7-methyl-1-indenyl)zirconium dichloride,
rac-Dimethylsilylene-bis(2-methyl-4-i-propyl-6-methyl-1-indenyl)zirconium dichloride,
rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilylene-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride, rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4,6-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium metal or hafnium metal in the above-mentioned compounds.

The transition metal compounds mentioned above are used generally in the form of racemic modification, but they can be used also in the form of R type or S type.

The indene derivative ligands for the transition metal compounds can be synthesized in accordance with ordinary organic synthesis through, for example, the aforementioned reaction route.

The transition metal compounds (metallocene compounds) represented by the formula (C) can be synthesized from these indene derivatives in accordance with conventionally known processes, for example, described in Japanese Patent Laid-Open Publication No. 268307/1992.

In the present invention, a bridge type transition metal compound (metallocene compound) represented by the following formula (D) is also employable.

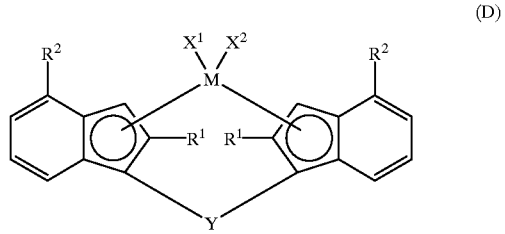

(D)

In the formula (D), M, $R^1$, $X^1$, $X^2$ and Y are the same as described for those in the aforesaid formula (B) or (C).

$R^1$ is preferably a hydrocarbon group, more preferably a hydrocarbon group of 1 to 4 carbon atoms, e.g., methyl, ethyl, propyl and butyl.

$X^1$ and $X^2$ are each preferably a halogen atom or a hydrocarbon group of 1 to 20 carbon atoms.

$R^2$ is an aryl group of 6 to 16 carbon atoms, for example, phenyl, α-naphthyl, β-naphthyl, anthracenyl, phenanthryl, pyrenyl, acenaphthyl, phenalenyl (perinaphthenyl) or aceanthrylenyl. Of these, phenyl or naphthyl is preferred. These aryl groups may be substituted with halogen atoms, hydrocarbon groups of 1 to 20 carbon atoms or halogenated hydrocarbon groups of 1 to 20 carbon atoms such as described for $R^1$.

Listed below are examples of the transition metal compounds (metallocene compounds) represented by the formula (D).

rac-Dimethylsilylene-bis(4-phenyl-1-indenyl)zirconium dichloride,
rac-Dimethylsilylene-bis(2-methyl-4-phenyl-1-indenyl)zirconium dichloride,
rac-Dimethylsilylene-bis(2-methyl-4-(α-naphthyl)-1-indenyl)zirconium dichloride,
rac-Dimethylsilylene-bis(2-methyl-4-(β-naphthyl)-1-indenyl)zirconium dichloride,
rac-Dimethylsilylene-bis(2-methyl-4-(1-anthracenyl)-1-indenyl)zirconium dichloride,
rac-Dimethylsilylene-bis(2-methyl-4-(2-anthracenyl)-1-indenyl)zirconium dichloride,
rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(o-chlorophenyl)-1-indenyl)zirconium dichloride,
rac-Dimethylsilylene-bis(2-methyl-4-(o,p-dichlorophenyl)phenyl-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl)zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl)zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylphenyl)-1-indenyl)zirconium dichloride,
rac-Dimethylsilylene-bis(2-methyl-4-(m-trimethylsilylphenyl)-1-indenyl)zirconium dichloride,
rac-Dimethylsilylene-bis(2-ethyl-4-phenyl-1-indenyl)zirconium dichloride,
rac-Diphenylsilylene-bis(2-ethyl-4-phenyl-1-indenyl)zirconium dichloride,
rac-Dimethylsilylene-bis(2-phenyl-4-phenyl-1-indenyl)zirconium dichloride,
rac-Dimethylsilylene-bis(2-n-propyl-4-phenyl-1-indenyl)zirconium dichloride,
rac-Diethylsilylene-bis(2-methyl-4-phenyl-1-indenyl)zirconium dichloride,
rac-Di-(i-propyl)silylene-bis(2-methyl-4-phenyl-1-indenyl)zirconium dichloride,
rac-Di-(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl)zirconium dichloride,
rac-Di(p-tolyl)silylene-bis(2-methyl-4-phenyl-1-indenyl)zirconium dichloride,
rac-Di(p-chlorophenyl)silylene-bis(2-methyl-4-phenyl-1-indenyl)zirconium dichloride,
rac-Methylene-bis(2-methyl-4-phenyl-1-indenyl)zirconium dichloride,
rac-Ethylene-bis(2-methyl-4-phenyl-1-indenyl)zirconium dichloride,
rac-Dimethylgermylene-bis(2-methyl-4-phenyl-1-indenyl)zirconium dichloride,
rac-Dimethylstannylene-bis(2-methyl-4-phenyl-1-indenyl)zirconium dichloride,
rac-Dimethylsilylene-bis(2-methyl-4-phenyl-1-indenyl)zirconium dibromide,
rac-Dimethylsilylene-bis(2-methyl-4-phenyl-1-indenyl)zirconium dimethyl,
rac-Dimethylsilylene-bis(2-methyl-4-phenyl-1-indenyl)zirconium methylchloride,
rac-Dimethylsilylene-bis(2-methyl-4-phenyl-1-indenyl)zirconium chloride $SO_2Me$, and
rac-Dimethylsilylene-bis(2-methyl-4-phenyl-1-indenyl)zirconium chloride $OSO_2Me$.

Also employable in the invention are transition metal compounds wherein zirconium is replaced with titanium metal or hafnium metal in the above-mentioned compounds.

The transition metal compounds represented by the formula (D) can be prepared in accordance with "Journal of Organometallic Chem.", 288(1985), pp. 63–67, and European Patent Publication No. 0,320,762 (specification and examples), for example, in the following manner.

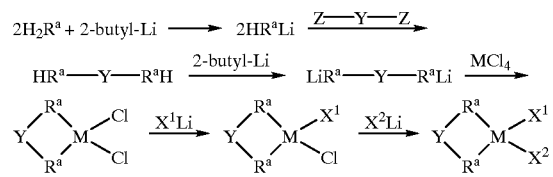

wherein Z is Cl, Br, I or o-tosyl, and H$_2$R$^a$ is

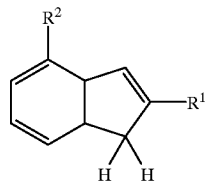

The transition metal compounds (D) are used generally in the form of racemic modification, but they can be used also in the form of R type or S type.

The metallocene compounds mentioned above can be used singly or in combination of two or more kinds.

The metallocene compounds can be used by supporting them on particulate carriers.

Examples of the particulate carriers include inorganic carriers, such as SiO$_2$, Al$_2$O$_3$, B$_2$O$_3$, MgO, ZrO$_2$, CaO, TiO$_2$, ZnO, SnO$_2$, BaO and ThO; and organic carriers, such as polyethylene, polypropylene, poly-1-butene, poly-4-methyl-1-pentene and styrene/divinylbenzene copolymer. These particulate carriers can be used singly or in combination of two or more kinds.

Next, the following compounds (b), (c) and (d) for forming the metallocene compounds are described:

(b) a compound which reacts with the transition metal M in the component (a) to form an ionic complex, namely, ionizing ionic compound, (c) an organoaluminum compound, and (d) aluminoxane (aluminum oxy-compound).

(b) Ionizina Ionic Compound

The ionizing ionic compound is a compound which reacts with the transition metal M in the transition metal complex component (a) to form an ionic complex, and examples of the ionizing ionic compounds include Lewis acid, ionic compounds, borane compounds and carborane compounds.

The Lewis acid is, for example, a compound represented by the formula BR$_3$ (R is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris (o-tolyl)boron and tris(3,5-dimethylphenyl)boron.

Examples of the ionic compounds include trialkyl-substituted ammonium salts, N,N-dialkylanilinium salts, dialkylammonium salts and triarylphosphonium salts. Particular examples of the trialkyl-substituted ammonium salts include triethylammoniumtetra(phenyl)boron, tripropylammoniumtetra(phenyl)boron and tri(n-butyl) ammoniumtetra(phenyl)boron. Particular examples of the dialkylammonium salts include di(1-propyl)ammoniumtetra (pentafluorophenyl)boron and dicyclohexylammoniumtetra (phenyl)boron. Further, triphenylcarbeniumtetrakis (pentafluorophenyl)borate, N,N-dimethylaniliniumtetrakis (pentafluorophenyl)borate and ferroceniumtetra (pentafluorophenyl)borate are also available as the ionic compounds.

Examples of the borane compounds include decaborane (14), bis[tri(n-butyl)ammonium]nonaborate, bis[tri(n-butyl) ammonium]decaborate, and salts of metallic borane anions such as bis[tri(n-butyl)ammonium]-bis (dodecahydridododecaborate)nickelate(III).

Examples of the carborane compounds include 4-carbanonaborane(14), 1,3-dicarbanonaborane(13), and salts of metallic carborane anions such as bis[tri(n-butyl) ammonium]bis(undecahydrido-7-carbaundecaborate) nickelate(IV).

The ionizing ionic compounds mentioned above can be used singly or in combination of two or more kinds.

The organoaluminum oxy-compounds and the ionizing ionic compounds can be used by supporting them on the aforesaid particulate carriers.

In the preparation of the catalyst, the below-described organoaluminum compound (c) may be used together with the organoaluminum oxy-compound and/or the ionizing ionic compound.

(c) Organoaluminum Compound

As the organoaluminum compound (c), a compound having at least one Al-carbon bond in the molecule is employable. The compound (c) is, for example, an organoaluminum compound represented by the following formula:

$$(R^1)_m Al(O(R^2))_n H_p X_q$$

wherein R$^1$ and R$^2$ may be the same or different and are each a hydrocarbon group of usually 1 to 15 carbon atoms, preferably 1 to 4 carbon atoms; X is a halogen atom; and m, n, p and q are numbers satisfying the conditions of $0 < m \leq 3$, $0 \leq n < 3$, $0 \leq p < 3$, $0 \leq q < 3$ and $m+n+p+q=3$.

(d) Oraanoaluminum Oxy-compound (aluminoxane)

The organoaluminum oxy-compound (d) may be conventional aluminoxane or such a benzene-insoluble organoaluminum oxy-compound as exemplified in Japanese Patent Laid-Open Publication No. 78687/1990.

The conventional aluminoxane (alumoxane) is represented by the following formula:

 (1)

 (2)

wherein R is a hydrocarbon group, such as methyl, ethyl, propyl or butyl, preferably methyl or ethyl, particularly preferably methyl; and m is an integer of 2 or greater, preferably an integer of 5 to 40.

The aluminoxane may be formed from mixed alkyloxy-aluminum units consisting of alkyloxyaluminum units represented by the formula (OAl(R$^1$)) and alkyloxyaluminum units represented by the formula (OAl(R$^2$)) (R$^1$ and R$^1$ are each the same hydrocarbon group as described for the above R, and R$^1$ and R$^2$ are different from each other).

The organoaluminum oxy-compound may contain a small amount of an organic compound of a metal other than aluminum.

In the present invention, the above-mentioned metallocene catalyst is preferably used as the olefin polymerization catalyst, however, (1) a known titanium catalyst comprising a solid titanium catalyst component and an organoaluminum compound or (2) a known vanadium catalyst comprising a soluble vanadium compound and an organoaluminum compound can be employed.

In the present invention, the α-olefin of 2 to 20 carbon atoms, the conjugated diene monomer and optionally the aromatic vinyl compound are copolymerized in the presence of the above-mentioned metallocene compound, generally in a liquid phase. In this copolymerization, a hydrocarbon solvent is generally used, but an α-olefin may be used as a solvent. The copolymerization can be carried out by any of batchwise and continuous processes.

When the copolymerization is batchwise conducted in the presence of the metallocene catalyst, the metallocene compound is used in an amount of usually 0.00005 to 1 mmol, preferably 0.0001 to 0.5 mmol, based on 1 liter of the polymerization volume.

The organoaluminum oxy-compound is used in such an amount that the molar ratio of the aluminum atom (Al) to the transition metal atom (M) in the metallocene compound (Al/M) becomes 1 to 10,000, preferably 10 to 5,000.

The ionizing ionic compound is used in such an amount that the molar ratio of the ionizing ionic compound to the metallocene compound (ionizing ionic compound/metallocene compound) becomes 0.5 to 20, preferably 1 to 10.

If the organoaluminum compound is used, the amount thereof is in the range of usually about 0 to 5 mmol, preferably about 0 to 2 mmol, based on 1 liter of the polymerization volume.

The copolymerization reaction is carried out under vthe conditions of a temperature of usually −20 to 150° C., preferably 0 to 120° C., more preferably 0 to 100° C., and a pressure of more than 0 kg/cm$^2$ and not more than 80 kg/cm$^2$, preferably more than 0 kg/cm$^2$ and not more than 50 kg/cm$^2$.

Though the reaction time (mean residence time in case of continuous polymerization process) varies depending upon the conditions such as catalyst concentration and polymerization temperature, it is in the range of usually 5 minutes to 3 hours, preferably 10 minutes to 1.5 hours.

The α-olefin of 2 to 20 carbon atoms, the conjugated diene monomer and optionally the aromatic vinyl compound are fed to the polymerization reaction system in such amounts that the unsaturated olefin copolymer (B) having the aforesaid specific component ratio can be obtained. In the copolymerization, a molecular weight modifier such as hydrogen can be employed.

When the α-olefin of 2 to 20 carbon atoms, the conjugated diene monomer and optionally the aromatic vinyl compound are copolymerized, the unsaturated olefin copolymer (B) is obtained generally as a polymerization solution containing said copolymer. The polymerization solution is treated in a conventional manner to obtain the unsaturated olefin copolymer (B).

In the preparation of the olefin thermoplastic elastomer composition from the crystalline polyolefin resin (A) and the unsaturated olefin copolymer (B), the ethylene/α-olefin/nonconjugated polyene copolymer (C), the peroxide-noncrosslinkable hydrocarbon rubber (D) and the softener (E) described below may be added.

(C) Ethylene/α-olefin/nonconiuaated Polyene Copolymer

The ethylene/α-olefin/nonconjugated polyene copolymer (C) is a copolymer comprising ethylene, an α-olefin of 3 to 20 carbon atoms and a nonconjugated polyene.

Examples of the α-olefins include the same α-olefins of 3 to 20 carbon atoms as exemplified for the unsaturated olefin copolymer (B), such as propylene, 1-butene, 4-methyl-1-pentene, 1-hexene and 1-octene.

Examples of the nonconjugated polyenes include nonconjugated dienes, such as dicyclopentadiene, 1,4-hexadiene, cyclooctadiene, methylene norbornene and ethylidene norbornene; nonconjugated trienes; and nonconjugated tetraenes.

In the ethylene/α-olefin/nonconjugated polyene copolymer (C), the ratio of ethylene units to α-olefin units (ethylene/α-olefin, by mol) is preferably in the range of 90/10 to 50/50.

The ethylene/α-olefin/nonconjugated polyene copolymer (C) desirably has a Mooney viscosity ($ML_{1+4}(100°$ C.$)$) of usually 10 to 250, preferably 40 to 150, and desirably has an iodine value of not more than 40.

In the olefin thermoplastic elastomer composition, the ethylene/α-olefin/nonconjugated polyene copolymer (C) is present generally in a crosslinked state.

The ethylene/α-olefin/nonconjugated polyene copolymer (C) is used in an amount of 1 to 50 parts by weight, preferably 5 to 40 parts by weight, based on 100 parts by weight of the total of the crystalline polyolefin resin (A), the unsaturated olefin copolymer (B), and at least one of the ethylene/α-olefin/nonconjugated polyene copolymer (C), the peroxide-noncrosslinkable hydrocarbon rubber (D) and the softener (E). When the ethylene/α-olefin/nonconjugated polyene copolymer (C) is used in this amount, an olefin thermoplastic elastomer composition further improved in the low-temperature resistance can be obtained.

(D) Peroxide-noncrosslinkable Hydrocarbon Rubber

The peroxide-noncrosslinkable hydrocarbon rubber (D) is a hydrocarbon type rubbery material which is not crosslinked and not lowered in the flowability even if it is dynamically heat treated at a temperature of not lower than its decomposition temperature in the presence of a peroxide (organic peroxide). Examples of such materials include butyl rubber, polyisobutylene rubber, and propylene/ethylene copolymer rubber having a propylene content of not less than 50% by mol, and propylene/1-butene copolymer rubber. Of these, butyl rubber or polyisobutylene rubber is particularly preferably employed.

The peroxide-noncrosslinkable hydrocarbon rubber (D) is used in an amount of 1 to 20 parts by weight, preferably 5 to 15 parts by weight, based on 100 parts by weight of the total of the crystalline polyolefin resin (A), the unsaturated olefin copolymer (B), and at least one of the ethylene/α-olefin/nonconjugated polyene copolymer (C), the peroxide-noncrosslinkable hydrocarbon rubber (D) and the softener (E). When the peroxide-noncrosslinkable hydrocarbon rubber (D) is used in this amount, an olefin thermoplastic elastomer composition further improved in the moldability and the appearance of its molded product can be obtained.

(D) Softener

As the softener (E)., those commonly added to rubbers are widely employed.

Examples of the softeners include:

petroleum type softeners, such as process oil, lubricating oil, paraffin, liquid paraffin, petroleum asphalt and vaseline;

coal tar type softeners, such as coal tar and coal tar pitch;

fatty oil type softeners, such as castor oil, linseed oil, rapeseed oil, soybean oil and coconut oil;

tall oil;

factice;

waxes, such as beeswax, carnauba wax and lanolin;

fatty acids and fatty acid salts, such as ricinolic acid, palmitic acid, stearic acid, barium stearate, calcium stearate and zinc laurate;

synthetic high-molecular materials, such as petroleum resins, coumarone-indene resin and atactic polypropylene;

ester type plasticizers, such as dioctyl phthalate, dioctyl adipate and dioctyl sebacate; and others, such as microcrystalline wax, liquid polybutadiene, its modified product or hydrogenated product, and liquid Thiokol.

The softener (E) is used in an amount of 1 to 40 parts by weight, preferably 10 to 35 parts by weight, based on 100 parts by weight of the total of the crystalline polyolefin resin (A), the unsaturated olefin copolymer (B), and at least one of the ethylene/α-olefin/nonconjugated polyene copolymer (C), the peroxide-noncrosslinkable hydrocarbon rubber (D) and the softener (E). When the softener (E) is used in this amount, an olefin thermoplastic elastomer composition exhibiting good flowability in the molding process can be obtained. If the softener (E) is used in a larger amount than the above, the mechanical properties of the resulting composition are occasionally lowered.

Preparation of the First and the Second Olefin Thermoplastic Elastomer Compositions For preparing the olefin thermoplastic elastomer compositions of the invention, the crystalline polyolefin resin (A), the unsaturated olefin copolymer (B), and at least one component selected from the ethylene/α-olefin/nonconjugated polyene copolymer (C), the peroxide-noncrosslinkable hydrocarbon rubber (D) and the softener (E) are employed. Specifically, these components are used in the following combinations and amounts:

(1) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight, and
  (C) the ethylene/α-olefin/nonconjugated polyene copolymer in an amount of 1 to 50 parts by weight, preferably 5 to 40 parts by weight;

(2) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight, and
  (D) the peroxide-noncrosslinkable hydrocarbon rubber in an amount of 1 to 20 parts by weight, preferably 5 to 15 parts by weight;

(3) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight, and
  (E). the softener in an amount of 1 to 40 parts by weight, preferably 10 to 35 parts by weight;

(4) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight,
  (C) the ethylene/α-olefin/nonconjugated polyene copolymer in an amount of 1 to 50 parts by weight, preferably 5 to 40 parts by weight, and
  (D) the peroxide-noncrosslinkable hydrocarbon rubber in an amount of 1 to 20 parts by weight, preferably 5 to 15 parts by weight;

(5) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight,
  (D) the peroxide-noncrosslinkable hydrocarbon rubber in an amount of 1 to 20 parts by weight, preferably 5 to 15 parts by weight, and
  (E) the softener in an amount of 1 to 40 parts by weight, preferably 10 to 35 parts by weight;

(6) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight,
  (C) the ethylene/α-olefin/nonconjugated polyene copolymer in an amount of 1 to 50 parts by weight, preferably 5 to 40 parts by weight, and
  (E) the softener in an amount of 1 to 40 parts by weight, preferably 10 to 35 parts by weight; and (7) a combination of:
  (A) the crystalline polyolefin resin in an amount of 10 to 60 parts by weight, preferably 15 to 50 parts by weight,
  (B) the unsaturated olefin copolymer in an amount of 10 to 85 parts by weight, preferably 15 to 65 parts by weight,
  (C) the ethylene/α-olefin/nonconjugated polyene copolymer in an amount of 1 to 50 parts by weight, preferably 5 to 40 parts by weight,
  (D) the peroxide-noncrosslinkable hydrocarbon rubber in an amount of 1 to 20 parts by weight, preferably 5 to 15 parts by weight, and
  (E) the softener in an amount of 1 to 40 parts by weight, preferably 10 to 35 parts by weight.

The total amount of the components in each of the above combinations (1) to (7) is 100 parts by weight.

To the first and the second olefin thermoplastic elastomer compositions of the invention can be added styrene copolymers, such as SEBS, SEPS and hydrogenated SBR; resins, such as polystyrene, polyester and nylon; and additives, such as heat stabilizer, antistatic agent, weathering stabilizer, anti-aging agent, filler, colorant and lubricant, in amounts not detrimental to the object of the invention.

The first and the second olefin thermoplastic elastomer compositions of the invention are each a composition obtained by dynamically heat treating a blend comprising the crystalline polyolefin resin (A) and the unsaturated olefin copolymer (B) in the presence of an organic peroxide, and are each an olefin thermoplastic elastomer composition wherein the unsaturated olefin copolymer (B) is crosslinked. In some cases, the crystalline polyolefin resin (A) and the unsaturated olefin copolymer (B) are crosslinked to each other.

The first and the second olefin thermoplastic elastomer compositions according to the invention may be each a composition obtained by dynamically heat treating a blend containing the ethylene/α-olefin/nonconjugated polyene copolymer (C), the peroxide-noncrosslinkable hydrocarbon rubber (D) and the softener (E) in addition to the crystalline polyolefin resin (A) and the unsaturated olefin copolymer (B), in the presence of an organic peroxide. This composition is an olefin thermoplastic elastomer composition wherein the unsaturated olefin copolymers (B) are crosslinked to one another, the ethylene/α-olefin/nonconjugated polyene copolymers (C) are crosslinked to one another, and the unsaturated olefin copolymer (B) and the ethylene/α-olefin/nonconjugated polyene copolymer (C) are crosslinked to each other. In some cases, the crystalline polyolefin resin (A) and the unsaturated olefin copolymer (B) are crosslinked to each other, or the crystalline polyolefin resin (A) and the ethylene/α-olefin/nonconjugated polyene copolymer (C) are crosslinked to each other.

The term "dynamically heat treating" used herein means that the components are kneaded in a molten state.

Examples of the organic peroxides employable in the invention include dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-diclorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, 2,5-dimethyl-2,5-di(tert-butylperoxy)hexane, 2,5-dimethyl-2,5-di(tert-butylperoxy)hexyne-3 and 1,3-bis(tert-butylperoxyisopropyl)benzene are preferable from the viewpoints of odor and scorch stability. Most preferable is 2,5-dimethyl-2,5-di(tert-butylperoxy)hexane.

The organic peroxide is used in an amount of 0.05 to 2% by weight, preferably 0.1 to 1.6% by weight, based on 100% by weight of the total of the crystalline polyolefin resin (A), the unsaturated olefin copolymer (B) and the ethylene/α-olefin/nonconjugated polyene copolymer (C).

In the present invention, a crosslinking aid can be used in combination with the organic peroxide.

Examples of the crosslinking aids include:

peroxy-crosslinking aids, such as sulfur, p-quinone dioxime, p,p'-dibenzoylquinone dioxime, N-methyl-N-4-dinitrosoaniline, nitrosobenzene, diphenylguanidine, trimethylolpropane-N,N'-m-phneylenedimaleimide;

polyfunctional methacrylate monomers, such as divinylbenzene, triallyl cyanurate, ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl butyrate and vinyl stearate.

By the use of the crosslinking aid, uniform and mild crosslinking reaction can be expected.

Of the above crosslinking aids, divinylbenzene is most preferable. Divinylbenzene can be easily handled and has good compatibility with the crystalline polyolefin resin (A), the unsaturated olefin copolymer (B) and the ethylene/α-olefin/nonconjugated polyene copolymer (C), which are main components to be crosslinked. Further, divinylbenzene has a function of solubilizing the organic peroxide and serves as a dispersant of the organic peroxide. Therefore, uniform crosslinking effect can be given by the heat treatment, and thereby an olefin thermoplastic elastomer composition showing good balance between flowability and physical properties can be obtained.

It is preferable that the crosslinking aid is used in an amount of 0.05 to 3% by weight, particularly 0.1 to 2% by weight, based on the total amount of the components to be crosslinked. If the amount of the crosslinking aid exceeds 3% by weight and if the organic peroxide is used in a large amount, the crosslinking reaction proceeds too rapidly, and thereby the resulting olefin thermoplastic elastomer composition shows poor flowability. If the amount of the crosslinking aid exceeds 3% by weight and if the organic peroxide is used in a small amount, the crosslinking aid remains as an unreacted monomer in the resulting olefin thermoplastic elastomer composition, and thereby the composition sometimes suffers change of properties that is caused by heat history during the molding process. For these reasons, an excess of the crosslinking aid should not be added.

The dynamic heat treatment is carried out using a kneading apparatus, such as a mixing roll, an intensive mixer (e.g., Banbury mixer, kneader) or a single-screw or twin-screw extruder, and it is preferable to conduct the dynamic heat treatment in a closed kneading apparatus. Further, the dynamic heat treatment is preferably conducted in an inert gas such as nitrogen.

The temperature of the heat treatment is usually in the range of a melting point of the crystalline polyolefin resin (A) to 300° C., and the kneading time is preferably in the range of 1 to 10 minutes. The shear force applied is desirably in the range of 500 to 10,000 sec$^{-1}$ in terms of shear rate.

In the first and the second olefin thermoplastic elastomer compositions of the invention, the unsaturated olefin copolymer (B) is involved to be crosslinked, and occasionally also the ethylene/α-olefin/nonconjugated polyene copolymer (C) is involved to be crosslinked. The term "crosslinked" used herein means that the copolymer has a gel content, as measured in the following manner, of not less than 20%. If the gel content is lower than the lower limit of the above range, the elastomeric properties tend to be lowered.

Measurement of Gel Content

About 100 mg of pellets (size: 0.5×0.5×0.5 mm) of an olefin thermoplastic elastomer composition is weighed out as a sample, and the pellets are immersed in 30 ml of cyclohexane at 23° C. for 48 hours in a closed container.

Then, the sample was taken out on a filter paper and dried at room temperature for not shorter than 72 hours until a constant weight is reached. From the weight of the dry residue, the weight of all of the cyclohexane-insoluble components other than the polymer component (e.g., filler, pigment, fibrous filler) and the weight of the crystalline polyolefin resin (A) in the sample before the immersion in cyclohexane are subtracted, and the obtained value is taken as "corrected final weight (Y)".

On the other hand, the total weight of the crosslinkable components of the sample, i.e., the total weight of the unsaturated olefin copolymer (B) and the ethylene/α-olefin/nonconjugated polyene copolymer (C), is taken as "corrected initial weight (X)".

The gel content is calculated from the following equation using the above-obtained values.

$$\text{Gel content } (\%) = (Y/X) \times 100$$

Next, the third olefin thermoplastic elastomer composition according to the invention is described.

The third olefin thermoplastic elastomer composition of the invention is a mixture of the first or the second olefin thermoplastic elastomer of the invention and a crystalline polyolefin resin (F).

The crystalline polyolefin resin (F) employable in the invention is, for example, the aforesaid crystalline polyolefin resin (A).

The crystalline polyolefin resin (F) is used in an amount of 5 to 200 parts by weight, preferably 5 to 100 parts by weight, based on 100 parts by weight of the first or the second olefin thermoplastic elastomer composition. When the crystalline polyolefin resin (F) is used in this amount, the moldability of the resulting thermoplastic elastomer composition can be further improved. However, if the amount of the crystalline polyolefin resin (F) exceeds 200 parts by weight, not only the flexibility inherent in elastomers is lowered but also the elastomeric properties tend to be lowered.

For mixing the first or the second olefin thermoplastic elastomer composition of the invention and the crystalline polyolefin resin (F), mixing methods hitherto known are available. For example, the olefin thermoplastic elastomer composition and the crystalline polyolefin resin (F) are mechanically blended using an extruder, a kneader or the like.

In the resulting olefin thermoplastic elastomer composition, neither crosslinkage between the unsaturated olefin copolymer (B) and the crystalline polyolefin resin (F) nor crosslinkage between the ethylene/α-olefin/nonconjugated polyene copolymer (C) and the crystalline polyolefin resin (F) takes place.

The thermoplastic elastomer composition of the invention has high crosslinking efficiency in the preparation process, so that unnecessary decomposition of the crystalline polyolefin resin (A) or the unsaturated olefin copolymer (B) does not take place, and therefore a molded product obtained from the composition exhibits excellent properties.

EFFECT OF THE INVENTION

The olefin thermoplastic elastomer compositions according to the invention have excellent moldability and can provide molded products having excellent elastomeric properties, tensile strength properties and appearance.

EXAMPLE

The present invention is further described with reference to the following examples, but it should be construed that the invention is in no way limited to those examples.

Synthesis 1
Pre-activation of Catalyst 16.0 Milligrams of isopropylidene-bis(indenyl)zirconium dichloride synthesized by a generally known process was weighed out and introduced into a glass container thoroughly purged with nitrogen. To the container, 15.2 ml of a toluene solution of methylaluminoxane (1.484 mmol/ml, referred to as "MAO" hereinafter) was added so that the amount of aluminum atom became 22.57 mmol, and the resulting mixture was subjected to ultrasonic irradiation at 23° C. for 15 minutes to prepare a catalyst solution.

Synthesis of Ethylene/propylene/isoprene Copolymer

To a 2-liter autoclave vacuum dried and purged with nitrogen, 177.2 ml of toluene, 60 ml of isoprene and 5,500 ml of propylene (25° C., 1 atom) were introduced at ordinary temperature. Subsequently, 0.3 ml of a toluene solution of triisobutylaluminum (1.0 mmol/ml) was added, and ethylene was fed with stirring so that the pressure of the system became 6 kg/cm$^2$-G, followed by releasing of the pressure. The operations of pressurizing and pressure-releasing were repeated three times. Thereafter, the system was set at 20° C. under normal pressure of ethylene and then pressurized to 6 kg/cm$^2$-G with ethylene. To the system, 1.52 ml of the catalyst solution prepared above was added to initiate copolymerization of ethylene, propylene and isoprene. As for the catalyst concentration, the isopropylidene-bis(indenyl) zirconium dichloride concentration in the whole system was 0.0123 mmol/L and the MAO concentration in the whole system was 7.5 mmol/L. During the polymerization, ethylene was continuously fed to maintain the internal pressure at 6 kg/cm$^2$-G. After 30 minutes, methyl alcohol was added to terminate the polymerization reaction. After release of pressure, the polymer solution was drawn out. To the polymer solution, an aqueous solution containing 5 ml of concentrated hydrochloric acid per 1 liter of water was added in a ratio of 1:1 (polymer solution:aqueous solution) to wash the polymer solution, whereby a catalyst residue was transferred into an aqueous phase. The resulting mixed solution was allowed to stand, and the aqueous phase was removed by separation. The remainder was washed twice with distilled water and subjected to oil-water separation. The polymerization liquid phase obtained by the oil-water separation was contacted with acetone in an amount of three times as much as the liquid phase with vigorous stirring to precipitate a polymer. The polymer was sufficiently washed with acetone, and the solid portion (copolymer) was collected by filtration. The copolymer was dried at 130° C. and 350 mmHg for 12 hours in a stream of nitrogen.

Thus, an ethylene/propylene/isoprene copolymer was obtained in a yield of 18.8 g. The copolymer had an intrinsic viscosity (η) (measured in decalin at 135° C.) of 1.4 dl/g, a glass transition temperature Tg of −40° C., an iodine value of 15 g/100 g, an ethylene content of 68.8% by mol, a propylene content of 25.7% by mol, a ring structure content of 3.5% by mol, a 1,2-addition structure content of 0.05% by mol, a 3,4-addition structure content of 1.25% by mol, a 1,4-addition structure content of 0.7% by mol and an activity of 10 kg/mmol-Zr·hr.

The results are set forth in Table 3.

Synthesis 2
Pre-activation of Catalyst 13.5 Milligrams of (dimethyl(t-butylamido)(tetramethyl-η$^5$-cyclopentadienyl)silane)-dichloride titanium synthesized by a generally known process was weighed out and introduced into a glass container thoroughly purged with nitrogen. To the container, 22.86 ml of a toluene solution of methylaluminoxane (0.808 mmol/ml, referred to as "MAO" hereinafter) was added so that the amount of aluminum atom became 22.05 mmol, and the resulting mixture was subjected to ultrasonic irradiation at 23° C. for 15 minutes to prepare a catalyst solution.

Synthesis of Ethylene/propylene/styrene/1.3-butadiene Copolymer

To a 2-liter autoclave vacuum dried and purged with nitrogen, 440.6 ml of toluene was introduced at ordinary temperature. Subsequently, ethylene was fed with stirring so that the pressure of the system became 6 kg/cm$^2$-G, followed by releasing of the pressure. The operations of pressurizing and pressure-releasing were repeated three times. Thereafter, 10 ml of styrene (25° C., 1 atom), 13 ml of 1,3-butadiene (25° C., 1 atom) and 4,400 ml of propylene (25° C., 1 atom) were added at normal pressure of ethylene, and the system was set at 20° C. Then, the system was pressurized to 6 kg/cm$^2$-G with ethylene, and 3.11 ml of the catalyst solution prepared above was added to initiate copolymerization of ethylene, propylene, styrene and 1,3-butadiene. As for the catalyst concentration, the (dimethyl (t-butylamido)(tetramethyl-η$^5$-cyclopentadienyl)silane) dichloride titanium concentration in the whole system was 0.01 mmol/L and the MAO concentration in the whole system was 6.0 mmol/L. During the polymerization, ethylene was continuously fed to maintain the internal pressure at 6 kg/cm$^2$-G. After 15 minutes, methyl alcohol was added to terminate the polymerization reaction. After release of pressure, the polymer solution was drawn out. To the polymer solution, an aqueous solution containing 5 ml of concentrated hydrochloric acid per 1 liter of water was added in a ratio of 1:1 (polymer solution:aqueous solution) to wash the polymer solution, whereby a catalyst residue was transferred into an aqueous phase. The resulting mixed solution was allowed to stand, and the aqueous phase was removed by separation. The remainder was washed twice with distilled water and then subjected to oil-water separation. The polymerization liquid phase obtained by the oil-water separation was contacted with acetone in an amount of three times as much as the liquid phase with vigorous stirring to precipitate a polymer. The polymer was sufficiently washed with acetone, and the solid portion (copolymer) was collected by filtration. The copolymer was dried at 130° C. and 350 mmHg for 12 hours in a stream of nitrogen.

Thus, an ethylene/propylene/styrene/1,3-butadiene copolymer was obtained in a yield of 9 g. The copolymer had an intrinsic viscosity (η) (measured in decalin at 135° C.) of 2.1 dl/g, a glass transition temperature Tg of −44° C., an iodine value of 17.5 g/100 g, an ethylene content of 63.6% by mol, a propylene content of 23.7% by mol, a styrene content of 5.4% by mol, a five-membered ring structure content of 4.8% by mol, a cyclopropane ring structure content of 0.1% by mol, a 1,2-addition structure content of 0.5% by mol, a 1,4-addition structure content of 1.9% by mol and an activity of 7.2 kg/mmol-Zr·hr.

The results are set forth in Table 3.

Synthesis 3

An unsaturated olefin copolymer was obtained in the same manner as in Synthesis 2, except that the (dimethyl(t-butylamido)(tetramethyl-$\eta^5$-cyclopentadienyl)silane)-dichloride titanium was replaced with isopropylidene-bis(indenyl)zirconium dichloride synthesized by a generally known process.

The ethylene/propylene/styrene/1,3-butadiene copolymer obtained above had an intrinsic viscosity (η) (measured in decalin at 135° C.) of 0.8 dl/g, a glass transition temperature Tg of −41° C., an iodine value of 17 g/100 g, an ethylene content of 65.1% by mol, a propylene content of 20.2% by mol, a styrene content of 7.8% by mol, a five-membered ring structure content of 4.4% by mol, a cyclopropane ring structure content of 0.1% by mol, a 1,2-addition structure content of 0.4% by mol and a 1,4-addition structure content of 2.0% by mol.

The results are set forth in Table 3.

TABLE 3

| (Unsaturated olefin copolymer) | | | |
|---|---|---|---|
| | Synthesis 1 | Synthesis 2 | Synthesis 3 |
| Composition of polymer (% by mol) | | | |
| Ethylene | 68.8 | 63.6 | 65.1 |
| Propylene | 25.7 | 23.7 | 20.2 |
| Styrene | — | 5.4 | 7.8 |
| Isoprene | 5.5 | — | — |
| 1,3-Butadiene | — | 7.3 | 6.9 |
| Diene structure | | | |
| 1,2-Addition | 0.05 | 0.5 | 0.4 |
| 3,4-Addition | 1.25 | — | — |
| 1,4-Addition | 0.7 | 1.9 | 2.0 |
| Cyclopentane ring | 3.5 | 4.8 | 4.4 |
| Cyclopropane ring | — | 0.1 | 0.1 |

TABLE 3-continued

| (Unsaturated olefin copolymer) | | | |
|---|---|---|---|
| | Synthesis 1 | Synthesis 2 | Synthesis 3 |
| Properties of polymer | | | |
| Intrinsic viscosity (η, dl/g) | 1.4 | 2.1 | 0.8 |
| Iodine value | 15 | 17.5 | 17 |
| Melting point (Tm, ° C.) | — | — | — |
| Tg (° C.) | −40 | −44 | −41 |
| Mw/Mn | 2.8 | 2.5 | 2.6 |

The melting point (Tm) and the glass transition temperature (Tg) in Table 3 were determined in the following manner.

An endothermic curve of the copolymer by DSC was obtained, and the temperature at the maximum peak position in the endothermic curve was taken as the melting point (Tm) of the copolymer.

The measurement was made in a manner that a sample was placed in an aluminum pan, heated up to 200° C. at a rate of 10° C./min, maintained at 200° C. for 5 minutes, cooled to −150° C. at a rate of 20° C./min and heated at a rate of 10° C./min to obtain an endothermic curve. From the endothermic curve, the melting point was found.

The Mw/Mn in Table 3 was measured by GPC (gel permeation chromatography) at 140° C. using an orthodichlorobenzene solvent.

Examples 1–3, Comparative Examples 1–6

The following starting materials were mixed in amounts (part(s) by weight) shown in Table 4 and kneaded at 180° C. for 5 minutes in a nitrogen atmosphere by the use of a Banbury mixer. The kneadate was passed through rolls to give a sheet, and the sheet was cut by a sheet cutter to prepare square pellets.

The square pellets, divinylbenzene (referred to as "DVB" hereinafter) and 2,5-dimethyl-2,5-(tert-butylperoxy)hexane (referred to as "POX" hereinafter) were mixed in amounts (part(s) by weight) shown in Table 4 and stirred by a Henschel mixer.

Then, the resulting mixture was extruded by a twin-screw extruder (L/D: 40, screw diameter: 50 mm) at a temperature of 220° C. in a nitrogen atmosphere to obtain an olefin thermoplastic elastomer composition.

The gel content of the olefin thermoplastic elastomer composition was determined in the aforesaid manner.

The compression set (compression conditions: 70° C., 22 hours), that is an indication of elastomeric properties, and the tensile strength were measured by the methods of JIS K 6301.

Further, the olefin thermoplastic elastomer composition was extrusion molded by a single-screw extruder (screw diameter: 50 mm) equipped with a die of ASTM-A method (Garvey die) under the following molding conditions to obtain a molded product having a wedge section.

Extrusion Molding Conditions

Preset temperature:
 C1/C2/C3/C4/C5/H/D=160/180/200/220/220/220/200° C.

Screw revolution number: 45 rpm

Screen mesh: 40/80/40 mesh.

Evaluation (relative evaluation) of the moldability and the appearance of the molded product was made by touching a side (surface) and a sharp-angle portion (edge) of the molded product and ranking the product as any one of 1 to 5 (five-rank evaluation, 5: good, 1: bad).

The degree of oil swelling ($\Delta V$) of the thermoplastic elastomer composition of each example was determined in the aforesaid manner.

The results are set forth in Table 4.

Starting Materials Used in the Examples (A) Crystalline polyolefin resin
  (A1) Propylene/ethylene block copolymer
    MFR (ASTM D 1238, 230° C., load of 2.16 kg): 12 g/10 min
    Ethylene content: 10% by mol
(B) Unsaturated olefin copolymer
  (B1) Ethylene/propylene/isoprene copolymer synthesized in Synthesis 1
  (B2) Ethylene/propylene/styrene/1,3-butadiene copolymer synthesized in Synthesis 2
  (B3) Ethylene/propylene/styrene/1,3-butadiene copolymer synthesized in Synthesis 3
(C) Ethylene/$\alpha$-olefin/nonconjugated polyene copolymer
  (C1) ethylene/propylene/5-ethylidene-2-norbornene copolymer rubber
    Ethylene content: 73% by mol
    Iodine value: 18
    Mooney viscosity ($ML_{1+4}$(100° C.)) 80
  (C2) Ethylene/propylene/5-ethylidene-2-norbornene copolymer
    Ethylene content: 70% by mol
    Iodine value: 15
    Intrinsic viscosity ($\eta$) (measured in decalin at 135° C.): 1.4 dl/g
  (C3) Ethylene/propylene/5-ethylidene-2-norbornene copolymer
    Ethylene content: 65% by mol
    Iodine value: 19
    Intrinsic viscosity ($\eta$) (measured in decalin at 135° C.): 2.2 dl/g
(D) Peroxide-noncrosslinkable hydrocarbon rubber
  (D1) Butyl rubber
    Degree of unsaturation: 0.7% by mol
    Mooney viscosity ($ML_{1+4}$(100° C.)):45
(E) Softener
  (E1) Mineral oil type process oil (trade name: PW-380, available from Idemitsu Kosan Co., Ltd.)
(G) Ethylene/$\alpha$-olefin/styrene/nonconjugated diene copolymer
  (G1) Ethylene/1-octene/styrene/5-ethylidene-2-norbornene copolymer
    Constituent units derived from ethylene/Constituent units derived from 1-octene: 90/10 by mol
    Total of constituent units derived from ethylene and 1-octene/Constituent units derived from styrene: 97/3 by mol
    Iodine value: 8
    Mooney viscosity ($ML_{1+4}$(100° C.)): 96.

Example 4

The procedure of Example 2 was repeated, except that the unsaturated olefin copolymer of Synthesis 3 was used in place of the unsaturated olefin copolymer of Synthesis 2. The results are set forth in Table 4.

TABLE 4

| | Example 1 | Example 2 | Example 3 | Example 4 |
|---|---|---|---|---|
| Starting Material (part(s) by weight) | | | | |
| A1 | 30 | 20 | 15 | 20 |
| B1 | 70 | — | 20 | — |
| B2 | — | 50 | — | — |
| B3 | — | — | — | 50 |
| C1 | — | — | 30 | — |
| C2 | — | — | — | — |
| C3 | — | — | — | — |
| D1 | — | 15 | 15 | 15 |
| E1 | — | 15 | 20 | 15 |
| G1 | — | — | — | — |
| POX | 0.15 | 0.4 | 0.3 | 0.4 |
| DVB | 0.2 | 0.4 | 0.3 | 0.4 |
| Composition Gel content (%) | 97 | 99 | 97 | 95 |
| Molded Product | | | | |
| JIS A hardness | 79 | 68 | 61 | 60 |
| Tensile strength (MPa) | 75 | 68 | 43 | 60 |
| Compression set (%) | 35 | 27 | 26 | 24 |
| Moldability | | | | |
| surface | 4 | 5 | 5 | 4 |
| edge | 4 | 4 | 5 | 4 |
| Oil resistance | | | | |
| $\Delta V$ (%) | 122 | 78 | 101 | — |
| ($\Delta V1/\Delta V2$) × 100 (%) | *1 82 | *2 84 | *3 88 | — |

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Starting Material (part(s) by weight) | | | | | | |
| A1 | 30 | 20 | 15 | 30 | 20 | 15 |
| B1 | — | — | — | — | — | — |
| B2 | — | — | — | — | — | — |
| B3 | — | — | — | — | — | — |
| C1 | 70 | — | 50 | — | — | 30 |
| C2 | — | — | — | 70 | — | 20 |
| C3 | — | — | — | — | 50 | — |
| D1 | — | 15 | 15 | — | 15 | 15 |
| E1 | — | 15 | 20 | — | 15 | 20 |
| G1 | — | 50 | — | — | — | — |
| POX | 0.15 | 0.4 | 0.3 | 0.15 | 0.4 | 0.3 |
| DVB | 0.2 | 0.4 | 0.3 | 0.2 | 0.4 | 0.3 |
| Composition Gel content (%) | 85 | 96 | 92 | — | — | — |
| Molded Product | | | | | | |
| JIS A hardness | 77 | 66 | 58 | — | — | — |
| Tensile strength (MPa) | 73 | 66 | 42 | — | — | — |
| Compression set (%) | 51 | 38 | 35 | — | — | — |
| Moldability | | | | | | |
| surface | 4 | 5 | 5 | — | — | — |
| edge | 3 | 4 | 5 | — | — | — |

TABLE 4-continued

Oil resistance

| ΔV (%) | — | — | — | 149 | 93 | 115 |
| (ΔV1/ΔV2) × 100 (%) | — | — | — | — | — | — |

*1: percentage of ΔV of Example 1/ΔV of Comparative Example 4
*2: percentage of ΔV of Example 2/ΔV of Comparative Example 5
*3: percentage of ΔV of Example 3/ΔV of Comparative Example 5

What is claimed is:

1. An olefin thermoplastic elastomer composition obtained by dynamically heat treating a blend in the presence of an organic peroxide, said blend comprising:

(A) a crystalline polyolefin resin in an amount of 10 to 60 parts by weight, and (B-1) an unsaturated olefin copolymer of at least one α-olefin of 2 to 20 carbon atoms and a conjugated diene monomer represented by the following formula (I), in an amount of 40 to 90 parts by weight, the total amount of said components (A) and (B-1) being 100 parts by weight;

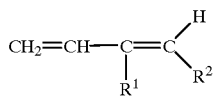

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

2. An olefin thermoplastic elastomer composition obtained by dynamically heat treating a blend in the presence of an organic peroxide, said blend comprising:

(A) a crystalline polyolefin resin in an amount of 10 to 60 parts by weight, and (B-2) an unsaturated olefin copolymer of at least one α-olefin of 2 to 20 carbon atoms, a conjugated diene monomer represented by the following formula (I) and an aromatic vinyl compound, in an amount of 40 to 90 parts by weight, the total amount of said components (A) and (B-2) being 100 parts by weight;

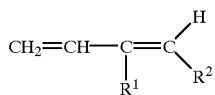

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

3. The olefin thermoplastic elastomer composition as claimed in claim 1, which is obtained by dynamically heat treating a blend in the presence of an organic peroxide, said blend comprising:

(A) a crystalline polyolefin resin in an amount of 10 to 60 parts by weight, (B-1) an unsaturated olefin copolymer of at least one α-olefin of 2 to 20 carbon atoms and a conjugated diene monomer represented by the formula (I), in an amount of 10 to 85 parts by weight, and at least one component selected from the group consisting of (C) an ethylene/α-olefin/nonconjugated polyene copolymer in an amount of 1 to 50 parts by weight, (D) a peroxide-noncrosslinkable hydrocarbon rubber in an amount of 1 to 20 parts by weight and (E) a softener in an amount of 1 to 40 parts by weight, the total amount of said components (A), (B-1), and at least one of (C), (D) and (E) being 100 parts by weight.

4. The olefin thermoplastic elastomer composition as claimed in claim 2, which is obtained by dynamically heat treating a blend in the presence of an organic peroxide, said blend comprising:

(A) a crystalline polyolefin resin in an amount of 10 to 60 parts by weight, (B-2) an unsaturated olefin copolymer of at least one α-olefin of 2 to 20 carbon atoms, a conjugated diene monomer represented by the formula (I) and an aromatic vinyl compound, in an amount of 10 to 85 parts by weight, and at least one component selected from the group consisting of (C) an ethylene/α-olefin/nonconjugated polyene copolymer in an amount of 1 to 50 parts by weight, (D) a peroxide-noncrosslinkable hydrocarbon rubber in an amount of 1 to 20 parts by weight and (E) a softener in an amount of 1 to 40 parts by weight, the total amount of said components (A), (B-2), and at least one of (C), (D) and (E) being 100 parts by weight.

5. The olefin thermoplastic elastomer composition as claimed in claim 1, wherein the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, and (b) the content of the constituent units derived from the conjugated diene monomer is in the range of 0.01 to 30% by mol.

6. The olefin thermoplastic elastomer composition as claimed in claim 2, wherein the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, and (b) the content of the constituent units derived from the conjugated diene monomer is in the range of 0.01 to 30% by mol.

7. The olefin thermoplastic elastomer composition as claimed in claim 3, wherein the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, and (b) the content of the constituent units derived from the conjugated diene monomer is in the range of 0.01 to 30% by mol.

8. The olefin thermoplastic elastomer composition as claimed in claim 4, wherein the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, and (b) the content of the constituent units derived from the conjugated diene monomer is in the range of 0.01 to 30% by mol.

9. The olefin thermoplastic elastomer composition as claimed in claim 1, wherein the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five-membered rings) is in the range of 20/80 to 90/10.

10. The olefin thermoplastic elastomer composition as claimed in claim 2, wherein the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five-membered rings) is in the range of 20/80 to 90/10.

11. The olefin thermoplastic elastomer composition as claimed in claim 3, wherein the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five-membered rings) is in the range of 20/80 to 90/10.

12. The olefin thermoplastic elastomer composition as claimed in claim 4, wherein the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five-membered rings) is in the range of 20/80 to 90/10.

13. The olefin thermoplastic elastomer composition as claimed in claim 5, wherein the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five membered rings) is in the range of 20/80 to 90/10.

14. The olefin thermoplastic elastomer composition as claimed in claim 6, wherein the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constitute units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five-membered rings) is in the range of 20/80 to 90/10.

15. The olefin thermoplastic elastomer composition as claimed in claim 7, wherein the unsaturated olefin copolymer (B-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) the content of the constituent units derived from the conjugated diene monomer is in the range of 0.01 to 30% by mol, and (c) five-membered rings are present in the main chain of said copolymer, and the quantity ratio of the double bonds from all of the addition units to the five-membered rings (total of double bonds from all addition units/five-membered rings) is in the range of 20/80 to 90/10.

16. The olefin thermoplastic elastomer composition as claimed in claim 8, wherein the unsaturated olefin copolymer (B-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/ aromatic vinyl compound) ranging from 99.5/0.5 to 50/50, and has the following properties:
  (a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1,
  (b) the content of the constituent units derived from the conjugated diene monomer is in the range of 0.01 to 30% by mol, and
  (c) five-membered rings are present in the main chain of said copolymer, and the quantity ratio of the double bonds from all of the addition units to the five-membered rings (total of double bonds from all addition units/five-membered rings) is in the range of 20/80 to 90/10.

17. The olefin thermoplastic elastomer composition as claimed in claim 5, wherein the unsaturated olefin copolymer (B-1) has an intrinsic viscosity ($\eta$), as measured in decalin at 135° C., of 0.1 to 10 dl/g.

18. The olefin thermoplastic elastomer composition as claimed in claim 5, wherein the unsaturated olefin copolymer (B-1) has an iodine value of 1 to 50.

19. The olefin thermoplastic elastomer composition as claimed in claim 5, wherein the conjugated diene monomer of the unsaturated olefin copolymer (B-1) is 1,3-butadiene or isoprene.

20. The olefin thermoplastic elastomer composition as claimed in claim 6, wherein the unsaturated olefin copolymer (B-2) has an intrinsic viscosity ($\eta$), as measured in decalin at 135° C., of 0.1 to 10 dl/g.

21. The olefin thermoplastic elastomer composition as claimed in claim 6, wherein the unsaturated olefin copolymer (B-2) has an iodine value of 1 to 50.

22. The olefin thermoplastic elastomer composition as claimed in claim 6, wherein the conjugated diene monomer of the unsaturated olefin copolymer (B-2) is 1,3-butadiene or isoprene.

23. The olefin thermoplastic elastomer composition as claimed in claim 7, wherein the unsaturated olefin copolymer (B-1) has an intrinsic viscosity ($\eta$), as measured in decalin at 135° C., of 0.1 to 10 dl/g.

24. The olefin thermoplastic elastomer composition as claimed in claim 7, wherein the unsaturated olefin copolymer (B-1) has an iodine value of 1 to 50.

25. The olefin thermoplastic elastomer composition as claimed in claim 7, wherein the conjugated diene monomer of the unsaturated olefin copolymer (B-1) is 1,3-butadiene or isoprene.

26. The olefin thermoplastic elastomer composition as claimed in claim 8, wherein the unsaturated olefin copolymer (B-2) has an intrinsic viscosity ($\eta$), as measured in decalin at 135° C., of 0.1 to 10 dl/g.

27. The olefin thermoplastic elastomer composition as claimed in claim 8, wherein the unsaturated olefin copolymer (B-2) has an iodine value of 1 to 50.

28. The olefin thermoplastic elastomer composition as claimed in claim 8, wherein the conjugated diene monomer of the unsaturated olefin copolymer (B-2) is 1,3-butadiene or isoprene.

29. The olefin thermoplastic elastomer composition as claimed in claim 9, wherein the unsaturated olefin copolymer (B-1) has an intrinsic viscosity ($\eta$), as measured in decalin at 135° C., of 0.1 to 10 dl/g.

30. The olefin thermoplastic elastomer composition as claimed in claim 9, wherein the unsaturated olefin copolymer (B-1) has an iodine value of 1 to 50.

31. The olefin thermoplastic elastomer composition as claimed in claim 9, wherein the conjugated diene monomer of the unsaturated olefin copolymer (B-1) is 1,3-butadiene or isoprene.

32. The olefin thermoplastic elastomer composition as claimed in claim 10, wherein the unsaturated olefin copolymer (B-2) has an intrinsic viscosity ($\eta$), as measured in decalin at 135° C., of 0.1 to 10 dl/g.

33. The olefin thermoplastic elastomer composition as claimed in claim 10, wherein the unsaturated olefin copolymer (B-2) an iodine value of 1 to 50.

34. The olefin thermoplastic elastomer composition as claimed in claim 10, wherein the conjugated diene monomer of the unsaturated olefin copolymer (B-2) is 1,3-butadiene or isoprene.

35. The olefin thermoplastic elastomer composition as claimed in claim 11, wherein the unsaturated olefin copolymer (B-1) has an intrinsic viscosity ($\eta$), as measured in decalin at 135° C., of 0.1 to 10 dl/g.

36. The olefin thermoplastic elastomer composition as claimed in claim 11, wherein the unsaturated olefin copolymer (B-1) has an iodine value of 1 to 50.

37. The olefin thermoplastic elastomer composition as claimed in claim 11, wherein the conjugated diene monomer of the unsaturated olefin copolymer (B-1) is 1,3-butadiene or isoprene.

38. The olefin thermoplastic elastomer composition as claimed in claim 12, wherein the unsaturated olefin copolymer (B-2) has an intrinsic viscosity ($\eta$), as measured in decalin at 135° C., of 0.1 to 10 dl/g.

39. The olefin thermoplastic elastomer composition as claimed in claim 12, wherein the unsaturated olefin copolymer (B-2) has an iodine value of 1 to 50.

40. The olefin thermoplastic elastomer composition as claimed in claim 12, wherein the conjugated diene monomer of the unsaturated olefin copolymer (B-2) is 1,3-butadiene or isoprene.

41. The olefin thermoplastic elastomer composition as claimed in claim 1, which is obtained by dynamically heat treating a blend in the presence of an organic peroxide, said blend comprising:
  (A) a crystalline polyolefin resin in an amount of 10 to 60 parts by weight, and
  (B-1) an unsaturated olefin copolymer of ethylene, at least one $\alpha$-olefin of 3 to 20 carbon atoms and a conjugated diene monomer represented by said formula (I), in an amount of 40 to 90 parts by weight,
    the total amount of said components (A) and (B-1) being 100 parts by weight;
    wherein the degree of oil swelling of the olefin thermoplastic elastomer composition is not more than 90% based on the degree of oil swelling of a thermoplastic elastomer composition containing an ethylene/$\alpha$-olefin/5-ethylidene-2-norbornene copolymer (X), said latter thermoplastic elastomer composition being obtained by dynamically heat treating, in the presence of an organic peroxide, a blend obtained in the same formulation as that of the blend for the former olefin thermoplastic elastomer composition except for using the ethylene/$\alpha$-olefin/5-ethylidene-2-norbornene (X) whose intrinsic viscosity ($\eta$) as measured in decalin at 135° C., iodine value and ethylene content are in the ranges of ±10% of values of the intrinsic viscosity (η), the iodine value and the ethylene content of the unsaturated olefin copolymer (B-1), respectively, and whose α-olefin is the same α-olefin of 3 to 20 carbon atoms as that of the unsaturated olefin copolymer (B-1).

42. The olefin thermoplastic elastomer composition as claimed in claim 2, which is obtained by dynamically heat treating a blend in the presence of an organic peroxide, said blend comprising:

(A) a crystalline polyolefin resin in an amount of 10 to 60 parts by weight, and (B-2) an unsaturated olefin copolymer of ethylene, at least one α-olefin of 3 to 20 carbon atoms, a conjugated diene monomer represented by said formula (I) and an aromatic vinyl compound, in an amount of 40 to 90 parts by weight, the total amount of said components (A) and (B-2) being 100 parts by weight;

wherein the degree of oil swelling of the olefin thermoplastic elastomer composition is not more than 90% based on the degree of oil swelling of a thermoplastic elastomer composition containing an ethylene/α-olefin/5-ethylidene-2-norbornene/ aromatic vinyl compound copolymer (X), said latter thermoplastic elastomer composition being obtained by dynamically heat treating, in the presence of an organic peroxide, a blend obtained in the same formulation as that of the blend for the former olefin thermoplastic elastomer composition except for using the ethylene/α-olefin/5-ethylidene-2-norbornene/aromatic vinyl compound copolymer (X) whose intrinsic viscosity (η) as measured in decalin at 135° C., iodine value, and contents of ethylene and the aromatic vinyl compound are in the ranges of ±10% of values of the intrinsic viscosity (η), the iodine value, and contents of ethylene and the aromatic vinyl compound of the unsaturated olefin copolymer (B-2), respectively, and whose α-olefin and aromatic vinyl compound are the same α-olefin of 3 to 20 carbon atoms and aromatic vinyl compound as that of the unsaturated olefin copolymer (B-2), respectively.

43. The olefin thermoplastic elastomer composition as claimed in claim 3, which is obtained by dynamically heat treating a blend in the presence of an organic peroxide, said blend comprising:

(A) a crystalline polyolefin resin in an amount of 10 to 60 parts by weight, and (B-1) an unsaturated olefin copolymer of ethylene, at least one α-olefin of 3 to 20 carbon atoms and a conjugated diene monomer represented by said formula (I), in an amount of 40 to 90 parts by weight, the total amount of said components (A) and (B-1) being 100 parts by weight;

wherein the degree of oil swelling of the olefin thermoplastic elastomer composition is not more than 90% based on the degree of oil swelling of a thermoplastic elastomer composition containing an ethylene/α-olefin/5-ethylidene-2-norbornene copolymer (X), said latter thermoplastic elastomer composition being obtained by dynamically heat treating, in the presence of an organic peroxide, a blend obtained in the same formulation as that of the blend for the former olefin thermoplastic elastomer composition except for using the ethylene/α-olefin/ 5-ethylidene-2-norbornene (X) whose intrinsic viscosity (η) as measured in decalin at 135° C., iodine value and ethylene content are in the ranges of ±10% of values of the intrinsic viscosity (η), the iodine value and the ethylene content of the unsaturated olefin copolymer (B-1), respectively, and whose α-olefin is the same α-olefin of 3 to 20 carbon atoms as that of the unsaturated olefin copolymer (B-1).

44. The olefin thermoplastic elastomer composition as claimed in claim 4, which is obtained by dynamically heat treating a blend in the presence of an organic peroxide, said blend comprising:

(A) a crystalline polyolefin resin in an amount of 10 to 60 parts by weight, and (B-2) an unsaturated olefin copolymer of ethylene, at least one α-olefin of 3 to 20 carbon atoms, a conjugated diene monomer represented by said formula (I) and an aromatic vinyl compound, in an amount of 40 to 90 parts by weight, the total amount of said components (A) and (B-2) being 100 parts by weight;

wherein the degree of oil swelling of the olefin thermoplastic elastomer composition is not more than 90% based on the degree of oil swelling of a thermoplastic elastomer composition containing an ethylene/α-olefin/5-ethylidene-2-norbornene/ aromatic vinyl compound copolymer (X), said latter thermoplastic elastomer composition being obtained by dynamically heat treating, in the presence of an organic peroxide, a blend obtained in the same formulation as that of the blend for the former olefin thermoplastic elastomer composition except for using the ethylene/α-olefin/5-ethylidene-2-norbornene/aromatic vinyl compound copolymer (X) whose intrinsic viscosity (η) as measured in decalin at 135° C., iodine value, and contents of ethylene and the aromatic vinyl compound are in the ranges of ±10% of values of the intrinsic viscosity (η), the iodine value, and contents of ethylene and the aromatic vinyl compound of the unsaturated olefin copolymer (B-2), respectively, and whose α-olefin and aromatic vinyl compound are the same α-olefin of 3 to 20 carbon atoms and aromatic vinyl compound as that of the unsaturated olefin copolymer (B-2), respectively.

45. An olefin thermoplastic elastomer composition comprising:

the olefin thermoplastic elastomer composition as claimed in claim 5, in an amount of 100 parts by weight, and (F) a crystalline polyolefin resin in an amount of 5 to 200 parts by weight.

46. An olefin thermoplastic elastomer composition comprising:

the olefin thermoplastic elastomer composition as claimed in claim 6, in an amount of 100 parts by weight, and (F) a crystalline polyolefin resin in an amount of 5 to 200 parts by weight.

47. An olefin thermoplastic elastomer composition comprising:

the olefin thermoplastic elastomer composition as claimed in claim 7, in an amount of 100 parts by weight, and (F) a crystalline polyolefin resin in an amount of 5 to 200 parts by weight.

48. An olefin thermoplastic elastomer composition comprising:

the olefin thermoplastic elastomer composition as claimed in claim 8, in an amount of 100 parts by weight, and (F) a crystalline polyolefin resin in an amount of 5 to 200 parts by weight.

49. An olefin thermoplastic elastomer composition comprising:
the olefin thermoplastic elastomer composition as claimed in claim 9, in an amount of 100 parts by weight, and
(F) a crystalline polyolefin resin in an amount of 5 to 200 parts by weight.

50. An olefin thermoplastic elastomer composition comprising:
the olefin thermoplastic elastomer composition as claimed in claim 10, in an amount of 100 parts by weight, and
(F) a crystalline polyolefin resin in an amount of 5 to 200 parts by weight.

51. An olefin thermoplastic elastomer composition comprising:
the olefin thermoplastic elastomer composition as claimed in claim 11, in an amount of 100 parts by weight, and
(F) a crystalline polyolefin resin in an amount of 5 to 200 parts by weight.

52. An olefin thermoplastic elastomer composition comprising:
the olefin thermoplastic elastomer composition as claimed in claim 12, in an amount of 100 parts by weight, and
(F) a crystalline polyolefin resin in an amount of 5 to 200 parts by weight.

* * * * *